US011624413B2

(12) United States Patent
Solum et al.

(10) Patent No.: US 11,624,413 B2
(45) Date of Patent: Apr. 11, 2023

(54) WEDGE BRAKE SYSTEM FOR PROPELLER ROTOR

(71) Applicant: Aerostar International, LLC, Columbia, MD (US)

(72) Inventors: David Solum, Sunnyvale, CA (US); Matthew Torres, Sunnyvale, CA (US); Christopher Bowles, Hollister, CA (US); Carey Hijmans, Morgan Hill, CA (US); Jonathan Nutzmann, Redwood City, CA (US); Kyle Brookes, Redwood City, CA (US)

(73) Assignee: Aerostar International, LLC, Columbia, MD (US)

( * ) Notice: Subject to any disclaimer, the term of this patent is extended or adjusted under 35 U.S.C. 154(b) by 361 days.

(21) Appl. No.: 16/881,072

(22) Filed: May 22, 2020

(65) Prior Publication Data

US 2021/0364051 A1 Nov. 25, 2021

(51) Int. Cl.
*F16D 55/02* (2006.01)
*F16D 65/16* (2006.01)
*B64B 1/40* (2006.01)
*F16D 121/22* (2012.01)

(52) U.S. Cl.
CPC ............. *F16D 55/02* (2013.01); *B64B 1/40* (2013.01); *F16D 65/16* (2013.01); *F16D 2121/22* (2013.01)

(58) Field of Classification Search
CPC ...... F16D 55/02; F16D 65/16; F16D 2121/22; B64B 1/40
See application file for complete search history.

(56) References Cited

U.S. PATENT DOCUMENTS

| 1,000,495 | A |   | 8/1911 | Clement |
|---|---|---|---|---|
| 1,076,632 | A |   | 10/1913 | Gammeter |
| 2,217,464 | A | * | 10/1940 | Arnold ................ F16D 27/08 188/72.1 |
| 3,050,156 | A |   | 8/1962 | Mathews et al. |
| 6,211,590 | B1 | * | 4/2001 | Albrecht ............... F16D 55/28 188/158 |

(Continued)

FOREIGN PATENT DOCUMENTS

| CN | 105793562 A | * | 7/2016 | ............ F03D 15/10 |
|---|---|---|---|---|
| CN | 108779839 A | * | 11/2018 | ............ B60T 1/005 |

*Primary Examiner* — Melanie Torres Williams
(74) *Attorney, Agent, or Firm* — Kim and Lahey Law Firm, LLC; Douglas W. Kim

(57) ABSTRACT

Aspects of the technology relate to a braking assembly for a lateral propulsion system of a high altitude platform (HAP) configured to operate in the stratosphere. Power is supplied to a propeller assembly as needed during lateral propulsion so that the HAP can move to a desired location or remain on station. When lateral propulsion is not needed, power is no longer supplied to the propeller assembly and it may slowly cease rotating. However, in certain situations, it may be necessary to cause the propeller assembly to stop rotating as soon as possible. This can include an unplanned descent. Rapid braking can avoid the propeller blades from entangling in the envelope, parachute or other parts of the HAP. A reusable brake is employed to prevent uncontrolled rotation of the propeller on descent, or otherwise to prevent the propeller from spinning freely when not being used to propel the HAP laterally.

16 Claims, 27 Drawing Sheets

(56) References Cited

U.S. PATENT DOCUMENTS

| | | | |
|---|---|---|---|
| 6,969,287 B1* | 11/2005 | Motsenbocker | B63H 21/22 440/71 |
| 8,220,599 B2* | 7/2012 | Fischer | B66B 5/18 188/161 |
| 8,593,006 B2 | 11/2013 | Wohlleb | |
| 8,979,506 B2* | 3/2015 | Kabir | F16D 41/12 417/214 |
| 9,534,584 B2 | 1/2017 | Ossyra | |
| 9,759,192 B2 | 9/2017 | Perley et al. | |
| 2008/0230330 A1 | 9/2008 | Herr | |
| 2011/0135465 A1 | 6/2011 | Braicks | |
| 2015/0240894 A1* | 8/2015 | Piech | F16D 55/00 188/163 |
| 2017/0260872 A1* | 9/2017 | Munevar | H02P 3/06 |
| 2018/0154875 A1* | 6/2018 | Takahashi | B60L 7/18 |

* cited by examiner

100

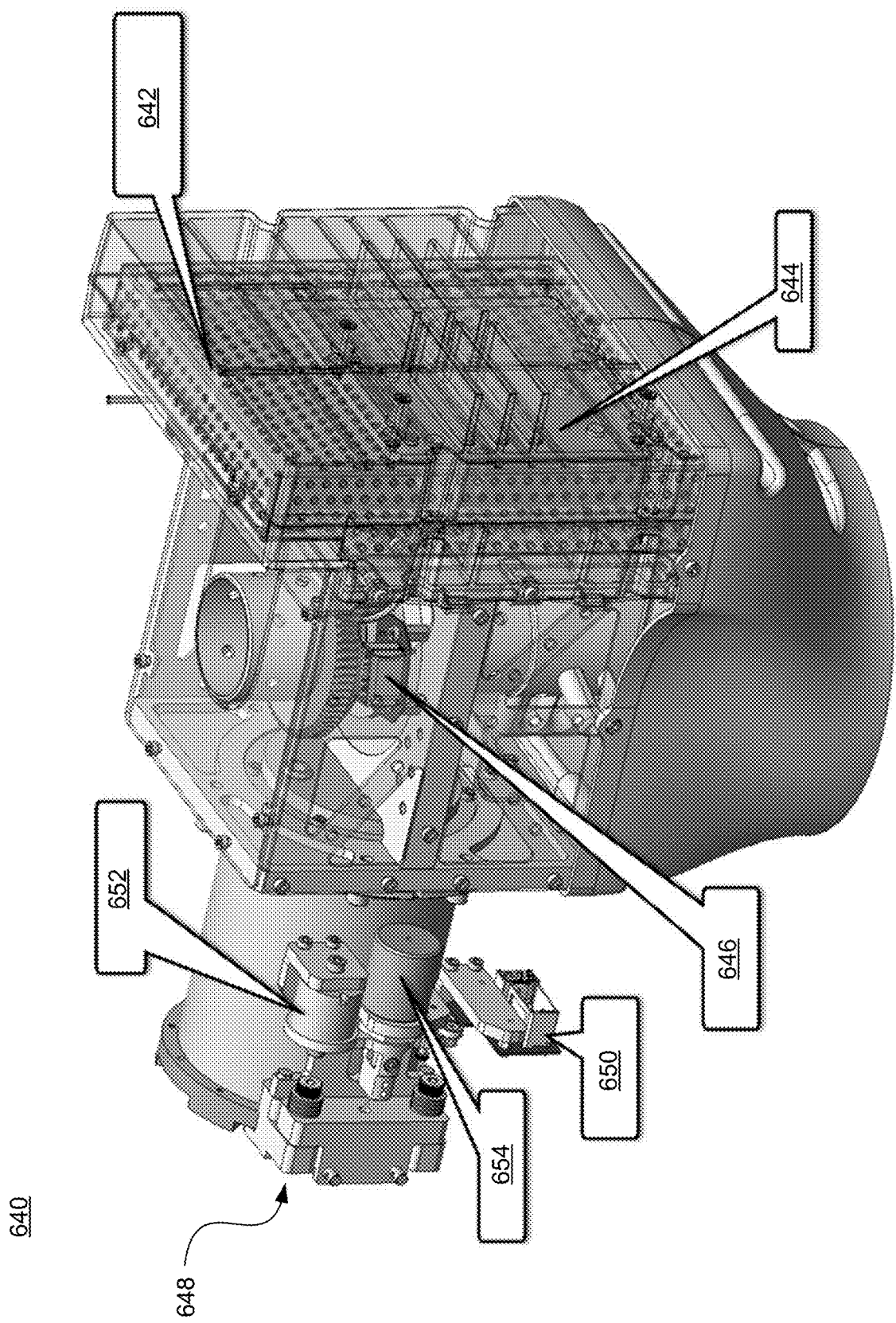

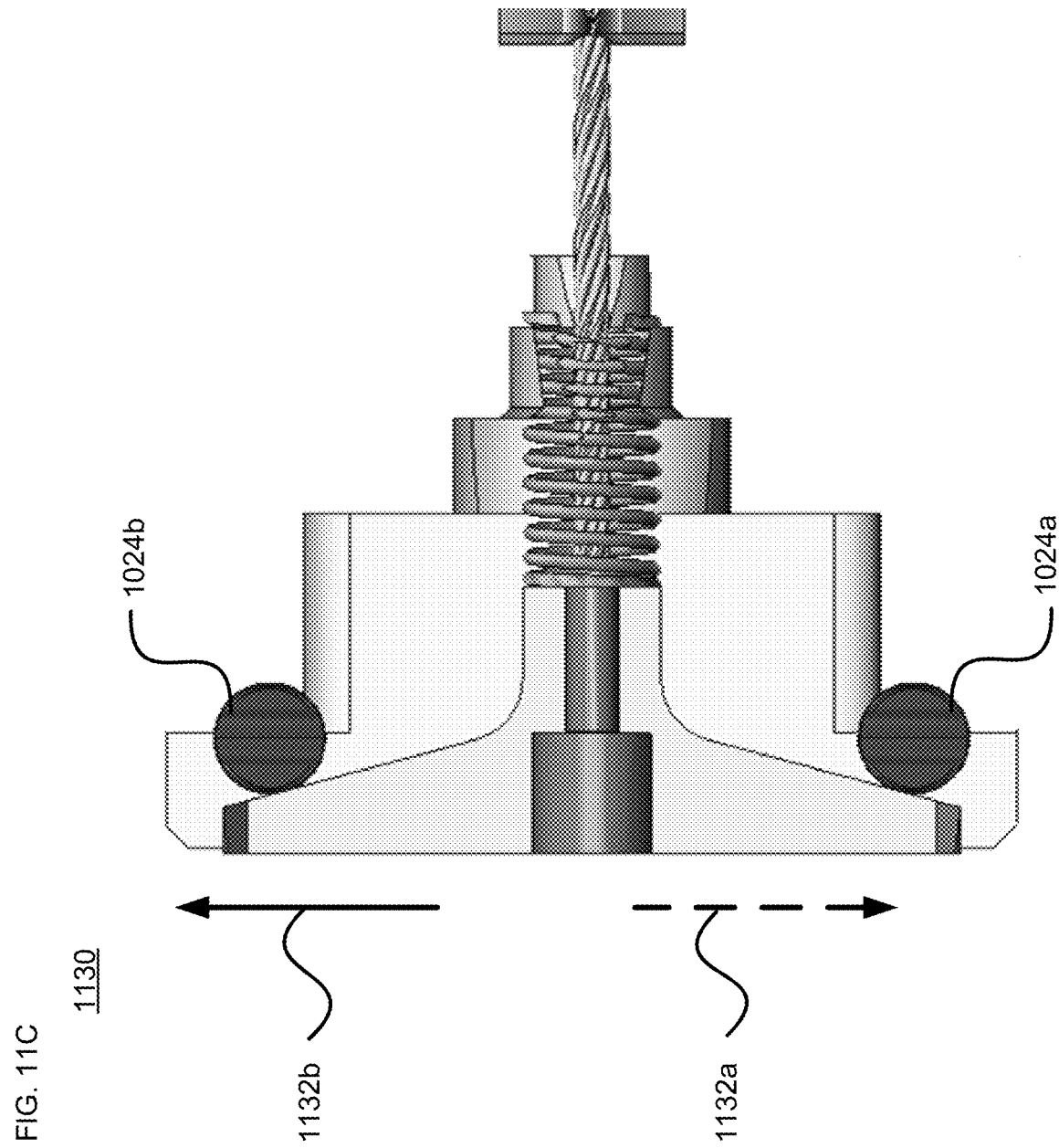

1140

1150

1300

1200

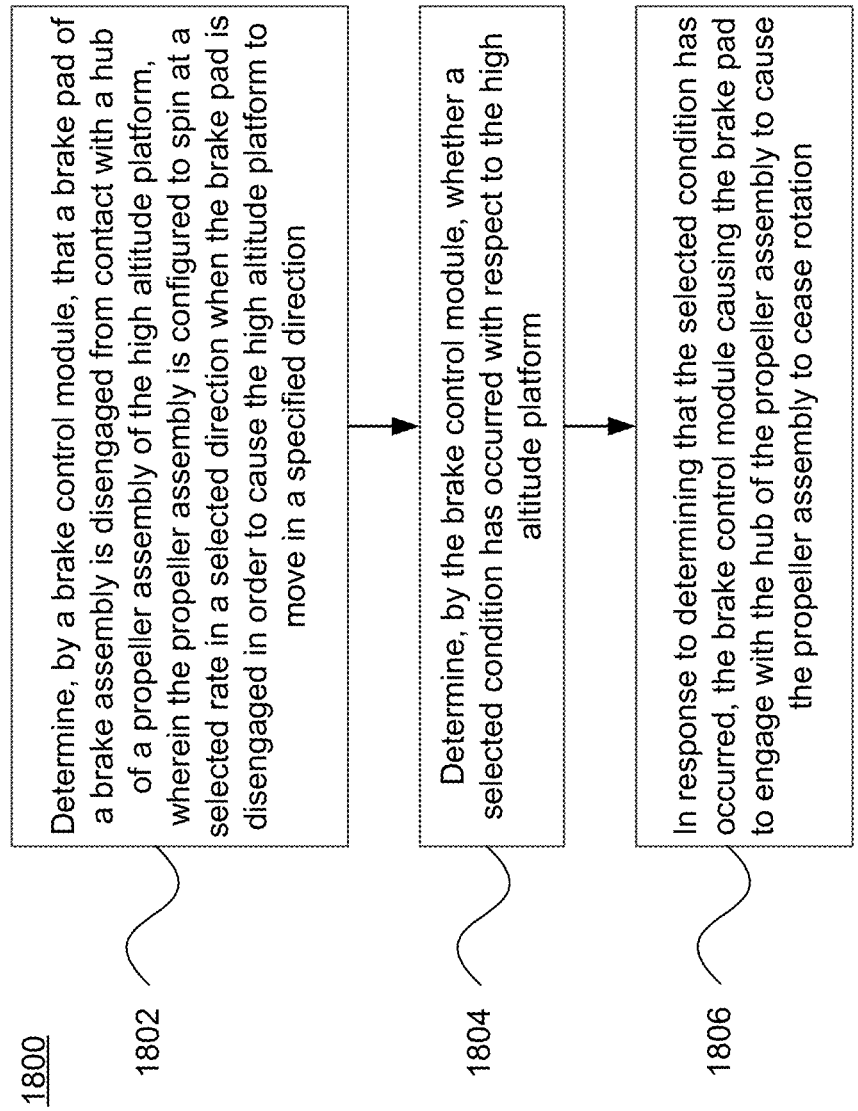

1802 — Determine, by a brake control module, that a brake pad of a brake assembly is disengaged from contact with a hub of a propeller assembly of the high altitude platform, wherein the propeller assembly is configured to spin at a selected rate in a selected direction when the brake pad is disengaged in order to cause the high altitude platform to move in a specified direction 1804 — Determine, by the brake control module, whether a selected condition has occurred with respect to the high altitude platform 1806 — In response to determining that the selected condition has occurred, the brake control module causing the brake pad to engage with the hub of the propeller assembly to cause the propeller assembly to cease rotation

WEDGE BRAKE SYSTEM FOR PROPELLER ROTOR

CROSS-REFERENCE TO RELATED APPLICATIONS

This application is related to U.S. application Ser. No. 16/881,085, entitled Wedge Brake Control System and Method filed concurrently herewith, the entire disclosure of which is incorporated herein by reference.

BACKGROUND

Telecommunications connectivity via the Internet, cellular data networks and other systems is available in many parts of the world. However, there are locations where such connectivity is unavailable, unreliable or subject to outages from natural disasters. Some systems may provide network access to remote locations or to locations with limited networking infrastructure via satellites or high altitude platforms. In the latter case, due to environmental conditions and other limitations, it is challenging to keep the platforms aloft and operational over a desired service area for long durations, such as weeks, months or more.

SUMMARY

Aspects of the technology relate to a high altitude platform (HAP) that is able to remain on station or move in a particular direction toward a desired location, for instance to provide telecommunication services. The high altitude platform may be a lighter-than-air platform such as a balloon configured to operate in the stratosphere. For instance, the balloon may include an envelope filled with lift gas and a payload for providing telecommunication services, with a connection member coupling the payload with the envelope. A lateral propulsion system may provide directional thrust for moving the balloon toward a destination or remaining on station. This can include a pointing mechanism that aligns a propeller assembly of the lateral propulsion system along a certain heading. By way of example, the propeller assembly may be able to rotate up to 360° or more around the connection member in order to adjust the balloon's heading.

During operation, the propeller is pointed along a specified heading and rotates at a particular velocity (e.g., hundreds or thousands of revolutions per minute). Power is supplied to the propeller as needed during lateral propulsion. When lateral propulsion is not needed, power is no longer supplied to the propeller and it may slowly cease rotating. However, in certain circumstances such as a catastrophic envelope failure or loss of overall system power, it may be necessary to cause the propeller to cease rotating immediately. This can be done, for instance, in an unplanned descent scenario to avoid a rotating propeller blade from entangling in the envelope, parachute or other parts of the high altitude platform. Aspects of the technology implement a reusable wedge brake to prevent uncontrolled rotation of the propeller on descent, e.g., due to dynamic pressure, or otherwise to prevent the propeller from spinning freely when not being used to propel the HAP laterally.

According to one aspect, a brake mechanism is configured to stop rotation of a propeller assembly. The brake mechanism comprises a brake pad configured to engage with a hub portion of the propeller assembly to stop the rotation of the propeller assembly, a housing receiving at least part of the brake pad therein during disengagement from the propeller assembly, a brake sensor configured to detect whether the brake pad is engaged with or disengaged from the hub portion of the propeller assembly, and an actuator assembly including a magnet and an actuator. The actuator assembly is configured to maintain the brake pad in a disengaged state during a first operational mode and to cause the brake pad to engage the hub portion of the propeller assembly during a second operational mode.

In one example, the actuator assembly further includes a spring coupling the brake pad to the actuator. The spring is configured to provide a spring force to cause the brake pad to engage the hub portion of the propeller assembly during the second operational mode. Here, the actuator assembly may further include an arm member coupled between the actuator and the spring. In this case, the brake mechanism may have a cable affixed to the brake pad and the arm member, wherein the spring is disposed around at least part of the cable. The arm member may include a first extension affixed to the magnet, a second extension opposite the first extension, and a central region disposed between the first extension and the second extension, the central region affixed to the actuator. Here, the brake mechanism may further comprise a second magnet affixed to the second extension, and a Hall Effect sensor in operative communication with the second magnet affixed to the second extension, in which the Hall Effect sensor is configured to detect the strength of a magnetic field associated with the second magnet to detect a relative displacement of the brake pad.

The actuator may be a solenoid. The housing may include a housing bracket and a cover section affixed to the housing bracket, where the housing bracket and the cover section define a receptacle to at least partly receive the brake pad. In this case, the housing bracket may have an arcuate side configured to abut a motor assembly that drives the propeller assembly.

According to another aspect, a propulsion system is provided for use with a high altitude platform configured to operate in the stratosphere. The propulsion system comprises a propeller assembly including a plurality of propeller blades and central propeller hub affixed to the plurality of propeller blades, a motor assembly, and a brake mechanism. The motor assembly is operatively coupled to the central propeller hub of the propeller assembly. The motor assembly is configured to actuate the propeller assembly to drive the high altitude platform in a lateral direction in the stratosphere. The brake mechanism is configured to stop rotation of the propeller assembly. The brake mechanism comprises a brake pad configured to engage with the propeller hub of the propeller assembly to stop the rotation of the propeller assembly, a housing receiving at least part of the brake pad therein during disengagement from the propeller assembly, a brake sensor configured to detect whether the brake pad is engaged with or disengaged from the propeller hub of the propeller assembly, and an actuator assembly including a magnet and an actuator. The actuator assembly is configured to maintain the brake pad in a disengaged state during a first operational mode and to cause the brake pad to engage the propeller hub of the propeller assembly during a second operational mode.

The actuator assembly may further include a spring coupling the brake pad to the actuator. The spring is configured to provide a spring force to cause the brake pad to engage the propeller hub of the propeller assembly during the second operational mode. Here, the actuator assembly may further include an arm member coupled between the actuator and the spring. The brake mechanism may include a cable affixed to the brake pad and the arm member, wherein the spring is disposed around at least part of the cable. The arm member may include a first extension affixed to the magnet, a second extension opposite the first extension, and a central region disposed between the first extension and the second extension, the central region affixed to the actuator. In one scenario, the propulsion system further comprises a second magnet affixed to the second extension, and a Hall Effect sensor in operative communication with the second magnet affixed to the second extension, in which the Hall Effect sensor is configured to detect a strength of a magnetic field associated with the second magnet to detect a displacement of the brake pad relative to the propeller hub.

The actuator may be a solenoid. In another example the housing includes a housing bracket and a cover section affixed to the housing bracket. Here, the housing bracket and the cover section define a receptacle to at least partly receive the brake pad. The housing bracket may include an arcuate side configured to abut a housing of the motor assembly.

According to a further aspect, a high altitude platform is provided, which is configured to operate in the stratosphere. The high altitude platform comprises a balloon envelope, a payload, a connecting member coupling the payload to the balloon envelope, and the propulsion system described above, wherein the propulsion system is operatively engaged with the connecting member. In one example, the high altitude platform further comprising a control system configured to actuate the brake mechanism for engagement with and disengagement from the propeller hub in response to a predetermined condition.

BRIEF DESCRIPTION OF THE DRAWINGS

FIGS. 6A-C illustrate a control assembly in accordance with aspects of the technology.

FIGS. 11A-G illustrate portions of the helical brake mechanism in accordance with aspects of the technology.

FIG. 18 illustrates another method according to aspects of the technology.

DETAILED DESCRIPTION

Overview

Figure 1:
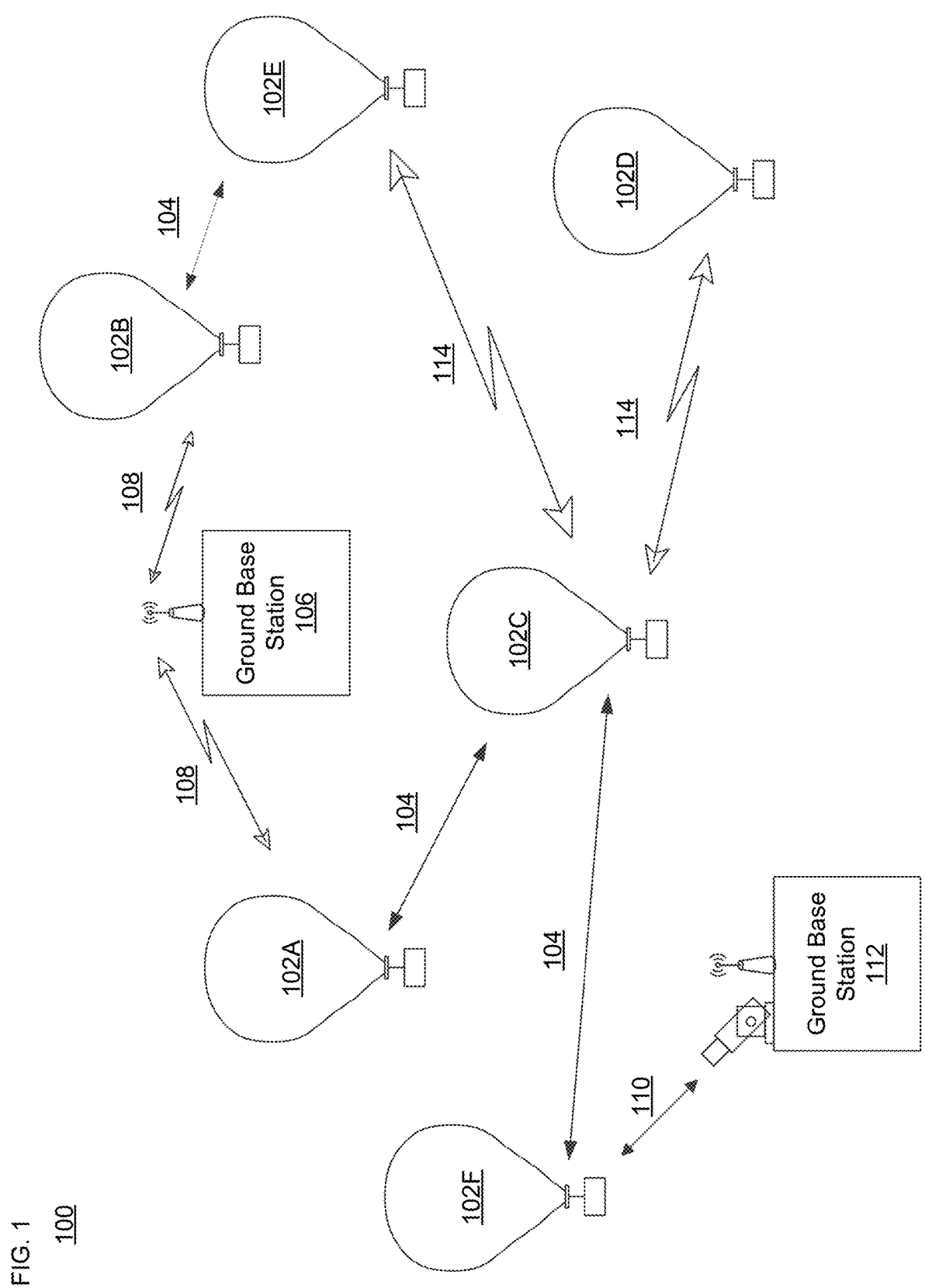
FIG. 1 is a functional diagram of an example system in accordance with aspects of the disclosure.

The technology relates to a brake system for a propeller assembly, such as may be used in lateral propulsion systems for HAPs designed to operate, e.g., in the stratosphere. Stratospheric HAPs, such as high altitude balloons and other lighter-than-air craft, may have a float altitude of between about 50,000-120,000 feet above sea level. The ambient temperature may be on the order of −10° C. to −90° C. or colder, depending on the altitude and weather conditions. These and other environmental factors in the stratosphere can be challenging for lateral propulsion systems.

Under typical operating conditions, the propeller assembly may only be powered for a certain period of time. When the power is turned off, the propeller assembly will slow down and eventually stop. However, in certain emergent situations it may be necessary to immediately cause the propeller assembly to stop rotating, such as during descent of the HAP. The brake system and methods discussed herein are designed to enable rapid braking of the propeller assembly in emergent situations, without affecting propeller operation otherwise.

As explained below, an example lateral propulsion system may employ a propeller assembly to provide directional adjustments to the HAP, for instance to counteract movement due to the wind, or to otherwise cause the HAP to move along a selected heading. Such adjustments can enhance operation across a fleet of HAPs. For instance, by employing a small amount of lateral propulsion at particular times, a given platform may remain on station over a desired service area for a longer period that without such propulsion, or change direction to move towards a particular destination. The platform may also be able to return to the desired service area more quickly using lateral propulsion to compensate against undesired wind effects. Applying this approach for some or all of the platforms in the fleet may mean that the total number of platforms necessary to provide a given level of service (e.g., telecommunications coverage for a service area) may be significantly reduced as compared to a fleet that does not employ lateral propulsion.

One or more motors can be used to actuate a lateral propulsion system of the HAP to effect the directional changes. This can include a pointing axis motor for rotating the lateral propulsion system to a particular heading, and a drive motor for causing a propeller assembly or other propulsion mechanism to turn on and off. In one example, a controller of the lateral propulsion system is configured to cause the pointing axis motor to rotate the propeller assembly about a connection member of the HAP by up to 360° or more. The drive motor may be actuated to provide a selected amount of propulsion, which may be based on the size of the propeller assembly and the speed of rotation. Depending on the mode of operation, the propeller assembly may rotate at speeds in excess of 2500 rpm. Once the drive motor is disengaged, it may take tens of seconds, minutes or longer for the propeller assembly to slow down and eventually stop rotating. Using a brake assembly enables the lateral propulsion system to cause the propeller assembly to quickly stop rotating, for instance within 0.3-2.0 seconds, without damaging the propeller assembly. This can be particularly beneficial in situations such as a rapid or uncontrolled descent, for instance to avoid entanglement with a parachute. By way of example, the brake can be used to prevent the propeller from spinning uncontrollably during descent due to dynamic pressure, e.g., when the propeller assembly is being back-driven because the propeller assembly is falling through increasingly dense air as the balloon descends. Back-driving an electric propeller motor can cause overvoltage in electronics and damage to the motor bearings or components. Stopping the propeller may not eliminate entanglement risk, but would prevent a rotating propeller from "grabbing" or "wrapping" of components such as parachutes. The braking arrangement can also be helpful to prevent the propeller from free spinning when not in use, which could generate heat and/or power at the propeller motor (and a potential overvoltage situation).

Example Balloon Systems

FIG. 1 depicts an example system 100 in which a fleet of high altitude platforms, such as balloon HAPs, may be used. This example should not be considered as limiting the scope of the disclosure or usefulness of the features described herein. System 100 may be considered a balloon network. In this example, balloon network 100 includes a plurality of devices, such as balloons 102A-F as well as ground-base stations 106 and 112. Balloon network 100 may also include a plurality of additional devices, such as various computing devices (not shown) as discussed in more detail below or other systems that may participate in the network.

The devices in system 100 are configured to communicate with one another. As an example, the balloons may include communication links 104 and/or 114 in order to facilitate intra-balloon communications. By way of example, links 114 may employ radio frequency (RF) signals (e.g., millimeter wave transmissions) while links 104 employ free-space optical transmission. Alternatively, all links may be RF, optical, or a hybrid that employs both RF and optical transmission. In this way balloons 102A-F may collectively function as a mesh network for data communications. At least some of the balloons may be configured for communications with ground-based stations 106 and 112 via respective links 108 and 110, which may be RF and/or optical links.

In one scenario, a given balloon 102 may be configured to transmit an optical signal via an optical link 104. Here, the given balloon 102 may use one or more high-power light-emitting diodes (LEDs) to transmit an optical signal. Alternatively, some or all of the balloons 102 may include laser systems for free-space optical communications over the optical links 104. Other types of free-space communication are possible. Further, in order to receive an optical signal from another balloon via an optical link 104, the balloon may include one or more optical receivers.

The balloons may also utilize one or more of various RF air-interface protocols for communication with ground-based stations via respective communication links. For instance, some or all of balloons 102A-F may be configured to communicate with ground-based stations 106 and 112 via RF links 108 using various protocols described in IEEE 802.11 (including any of the IEEE 802.11 revisions), cellular protocols such as GSM, CDMA, UMTS, EV-DO, WiMAX, and/or LTE, 5G and/or one or more proprietary protocols developed for long distance communication, among other possibilities.

In some examples, the links may not provide a desired link capacity for balloon-to-ground communications. For instance, increased capacity may be desirable to provide backhaul links from a ground-based gateway. Accordingly, an example network may also include downlink balloons, which could provide a high-capacity air-ground link between the various balloons of the network and the ground-base stations. For example, in balloon network 100, balloon 102F may be configured as a downlink balloon that directly communicates with station 112.

Like other balloons in network 100, downlink balloon 102F may be operable for communication (e.g., RF or optical) with one or more other balloons via link(s) 104. Downlink balloon 102F may also be configured for free-space optical communication with ground-based station 112 via an optical link 110. Optical link 110 may therefore serve as a high-capacity link (as compared to an RF link 108) between the balloon network 100 and the ground-based station 112. Downlink balloon 102F may additionally be operable for RF communication with ground-based stations 106. In other cases, downlink balloon 102F may only use an optical link for balloon-to-ground communications. Further, while the arrangement shown in FIG. 1 includes just one downlink balloon 102F, an example balloon network can also include multiple downlink balloons. On the other hand, a balloon network can also be implemented without any downlink balloons.

A downlink balloon may be equipped with a specialized, high bandwidth RF communication system for balloon-to-ground communications, instead of, or in addition to, a free-space optical communication system. The high bandwidth RF communication system may take the form of an ultra-wideband system, which may provide an RF link with substantially the same capacity as one of the optical links 104.

In a further example, some or all of balloons 102A-F could be configured to establish a communication link with space-based satellites and/or other types of high altitude platforms (e.g., drones, airplanes, airships, etc.) in addition to, or as an alternative to, a ground based communication link. In some embodiments, a balloon may communicate with a satellite or a high altitude platform via an optical or RF link. However, other types of communication arrangements are possible.

As noted above, the balloons 102A-F may collectively function as a mesh network. More specifically, since balloons 102A-F may communicate with one another using free-space optical links, the balloons may collectively function as a free-space optical mesh network. In a mesh-network configuration, each balloon may function as a node of the mesh network, which is operable to receive data directed to it and to route data to other balloons. As such, data may be routed from a source balloon to a destination balloon by determining an appropriate sequence of links between the source balloon and the destination balloon.

The network topology may change as the balloons move relative to one another and/or relative to the ground. Accordingly, the balloon network 100 may apply a mesh protocol to update the state of the network as the topology of the network changes. For example, to address the mobility of the balloons 102A to 102F, the balloon network 100 may employ and/or adapt various techniques that are employed in mobile ad hoc networks (MANETs). Other examples are possible as well.

Balloon network 100 may also implement station-keeping functions using winds and altitude control and/or lateral propulsion to help provide a desired network topology. For example, station-keeping may involve some or all of balloons 102A-F maintaining and/or moving into a certain position relative to one or more other balloons in the network (and possibly in a certain position relative to a ground-based station or service area). As part of this process, each balloon may implement station-keeping functions to determine its desired positioning within the desired topology, and if necessary, to determine how to move to and/or maintain the desired position. Alternatively, the platforms may be moved without regard to the position of their neighbors, for instance to enhance or otherwise adjust communication coverage at a particular geographic location.

The desired topology may thus vary depending upon the particular implementation and whether or not the balloons are continuously moving. In some cases, balloons may implement station-keeping to provide a substantially uniform topology where the balloons function to position themselves at substantially the same distance (or within a certain range of distances) from adjacent balloons in the balloon network 100. Alternatively, the balloon network 100 may have a non-uniform topology where balloons are distributed more or less densely in certain areas, for various reasons. As an example, to help meet the higher bandwidth demands, balloons may be clustered more densely over areas with greater demand (such as urban areas) and less densely over areas with lesser demand (such as over large bodies of water). In addition, the topology of an example balloon network may be adaptable allowing balloons to adjust their respective positioning in accordance with a change in the desired topology of the network.

The balloons of FIG. 1 may be high-altitude balloons that are deployed in the stratosphere. As an example, in a high altitude balloon network, the balloons may generally be configured to operate at stratospheric altitudes, e.g., between 50,000 ft and 70,000 ft or more or less, in order to limit the balloons' exposure to high winds and interference with commercial airplane flights. In order for the balloons to provide a reliable mesh network in the stratosphere, where winds may affect the locations of the various balloons in an asymmetrical manner, the balloons may be configured to move latitudinally and/or longitudinally relative to one another by adjusting their respective altitudes, such that the wind carries the respective balloons to the respectively desired locations. Lateral propulsion may also be employed to affect the balloon's path of travel.

Figure 2:
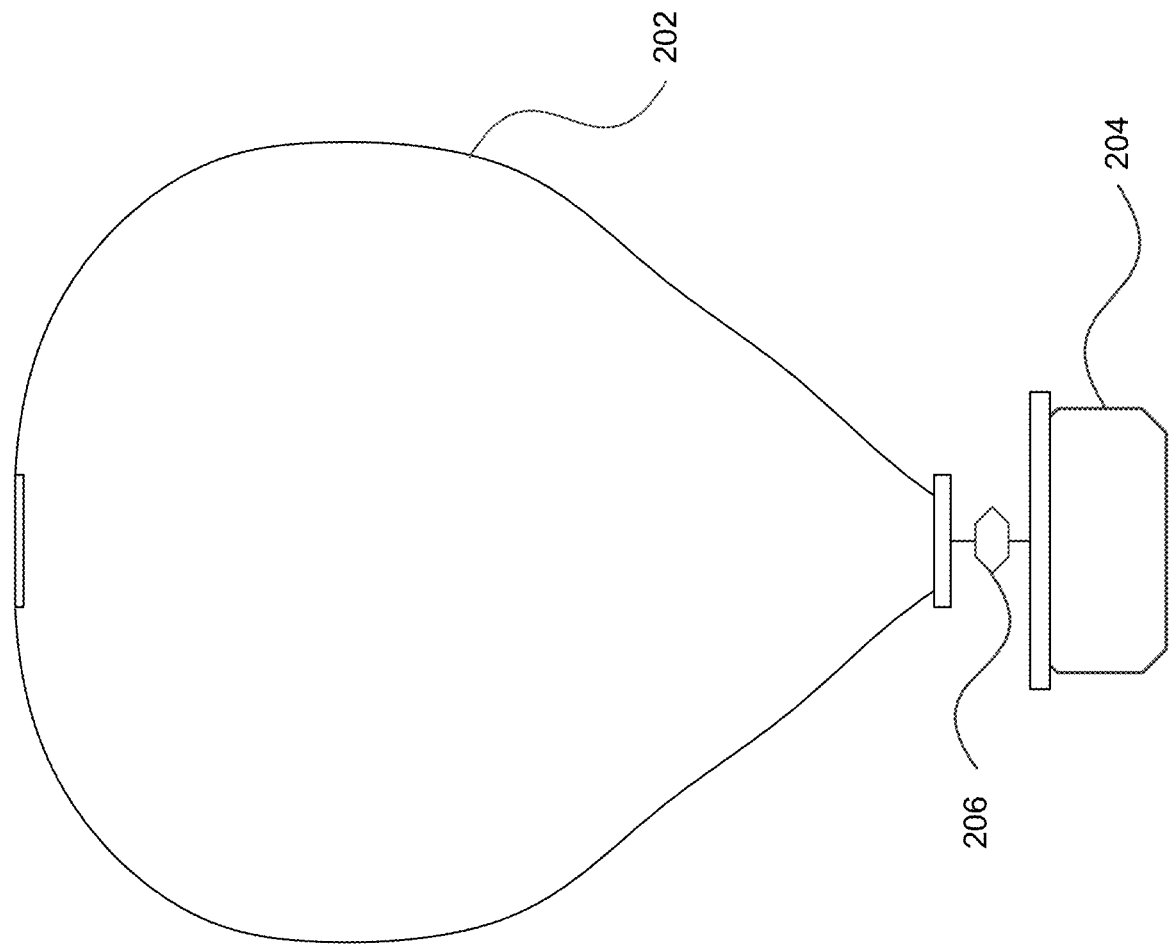
FIG. 2 illustrates a balloon configuration in accordance with aspects of the disclosure.

In an example configuration, the high altitude balloon platforms include an envelope and a payload, along with various other components. FIG. 2 is one example of a high-altitude balloon 200, which may represent any of the balloons of FIG. 1. As shown, the example balloon 200 includes an envelope 202, a payload 204 and a termination (e.g., cut-down & parachute) device 206.

The envelope 202 may take various shapes and forms. For instance, the envelope 202 may be made of materials such as polyethylene, mylar, FEP, rubber, latex or other thin film materials or composite laminates of those materials with fiber reinforcements imbedded inside or outside. Other materials or combinations thereof or laminations may also be employed to deliver required strength, gas barrier, RF and thermal properties. Furthermore, the shape and size of the envelope 202 may vary depending upon the particular implementation. Additionally, the envelope 202 may be filled with different types of gases, such as air, helium and/or hydrogen. Other types of gases, and combinations thereof, are possible as well. Shapes may include typical balloon shapes like spheres and "pumpkins", or aerodynamic shapes that are symmetric, provide shaped lift, or are changeable in shape. Lift may come from lift gasses (e.g., helium, hydrogen), electrostatic charging of conductive surfaces, aerodynamic lift (wing shapes), air moving devices (propellers, flapping wings, electrostatic propulsion, etc.) or any hybrid combination of lifting techniques.

Figure 3:
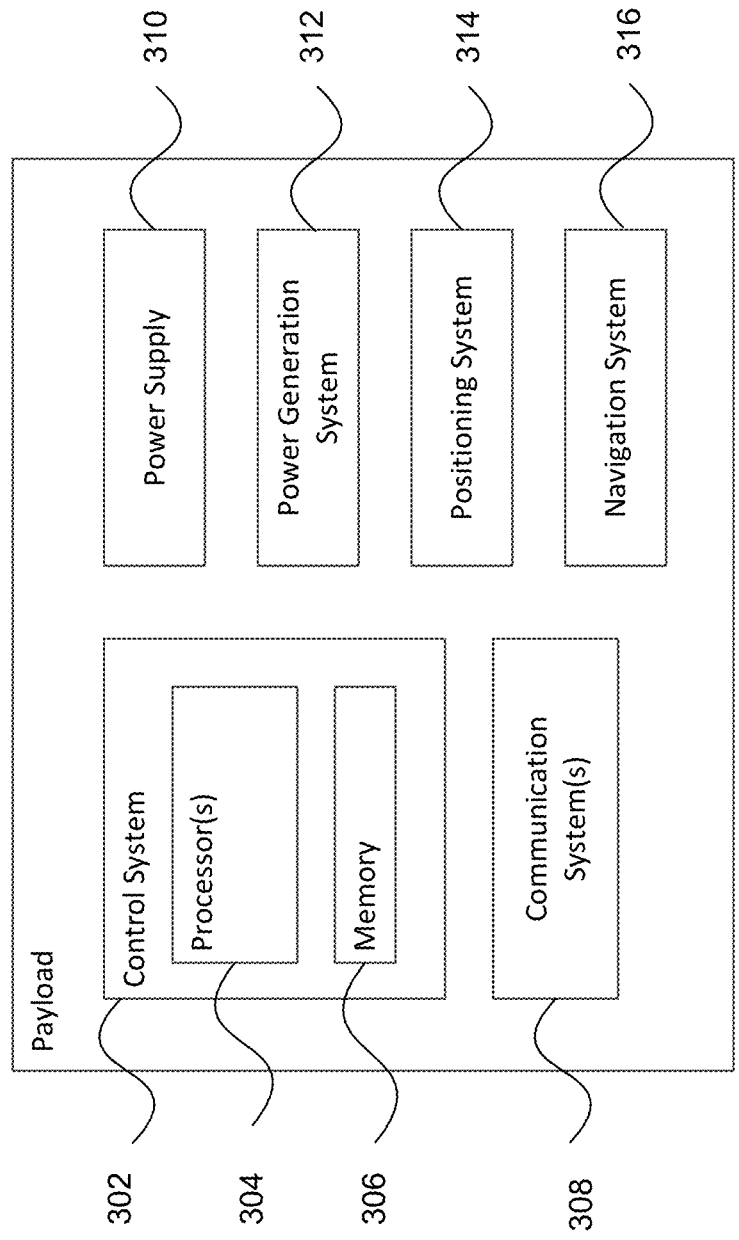
FIG. 3 is an example payload arrangement in accordance with aspects of the disclosure.

According to one example shown in FIG. 3, a payload 300 of a HAP platform includes a control system 302 having one or more processors 304 and on-board data storage in the form of memory 306. Memory 306 stores information accessible by the processor(s) 304, including instructions that can be executed by the processors. The memory 306 also includes data that can be retrieved, manipulated or stored by the processor. The memory can be of any non-transitory type capable of storing information accessible by the processor, such as a hard-drive, memory card, ROM, RAM, and other types of write-capable, and read-only memories. The instructions can be any set of instructions to be executed directly, such as machine code, or indirectly, such as scripts, by the processor. In that regard, the terms "instructions," "application," "steps" and "programs" can be used interchangeably herein. The instructions can be stored in object code format for direct processing by the processor, or in any other computing device language including scripts or collections of independent source code modules that are interpreted on demand or compiled in advance. The data can be retrieved, stored or modified by the one or more processors 304 in accordance with the instructions.

The one or more processors 304 can include any conventional processors, such as a commercially available CPU. Alternatively, each processor can be a dedicated component such as an ASIC, controller, or other hardware-based processor. Although FIG. 3 functionally illustrates the processor(s) 304, memory 306, and other elements of control system 302 as being within the same block, the system can actually comprise multiple processors, computers, computing devices, and/or memories that may or may not be stored within the same physical housing. For example, the memory can be a hard drive, memory card or other storage media located in a housing different from that of control system 302. Accordingly, references to a processor, computer, computing device, or memory will be understood to include references to a collection of processors, computers, computing devices, or memories that may or may not operate in parallel.

The payload 300 may also include various other types of equipment and systems to provide a number of different functions. For example, as shown the payload 300 includes one or more communication systems 308, which may transmit signals via RF and/or optical links as discussed above. The communication system(s) 308 include communication components such as one or more transmitters and receivers (or transceivers), one or more antennae, and a baseband processing subsystem. (not shown).

The payload 300 is illustrated as also including a power supply 310 to supply power to the various components of balloon. The power supply 310 could include one or more rechargeable batteries or other energy storage systems like capacitors or regenerative fuel cells. In addition, the balloon 300 may include a power generation system 312 in addition to or as part of the power supply. The power generation system 312 may include solar panels, stored energy (hot air), relative wind power generation, or differential atmospheric charging (not shown), or any combination thereof, and could be used to generate power that charges and/or is distributed by the power supply 310.

The payload 300 may additionally include a positioning system 314. The positioning system 314 could include, for example, a global positioning system (GPS), an inertial navigation system (INS), and/or a star-tracking system. The positioning system 314 may additionally or alternatively include various motion sensors (e.g., accelerometers, magnetometers, gyroscopes, and/or corn passes). The positioning system 314 may additionally or alternatively include one or more video and/or still cameras, and/or various sensors for capturing environmental data. Some or all of the components and systems within payload 300 may be implemented in a radiosonde or other probe, which may be operable to measure, e.g., pressure, altitude, geographical position (latitude and longitude), temperature, relative humidity, and/or wind speed and/or wind direction, among other information. Wind sensors may include different types of components like pitot tubes, hot wire or ultrasonic anemometers or similar, windmill or other aerodynamic pressure sensors, laser/lidar, or other methods of measuring relative velocities or distant winds.

Payload 300 may include a navigation system 316 separate from, or partially or fully incorporated into control system 302. The navigation system 316 may implement station-keeping functions to maintain position within and/or move to a position in accordance with a desired topology or other service requirement. In particular, the navigation system 316 may use wind data (e.g., from onboard and/or remote sensors) to determine altitudinal and/or lateral positional adjustments that result in the wind carrying the balloon in a desired direction and/or to a desired location. Lateral positional adjustments may also be handled directly by a lateral propulsion system that is separate from the payload. Alternatively, the altitudinal and/or lateral adjustments may be computed by a central control location and transmitted by a ground based, air based, or satellite based system and communicated to the HAP. In other embodiments, specific HAPs may be configured to compute altitudinal and/or lateral adjustments for other HAPs and transmit the adjustment commands to those other HAPs.

Figure 4:
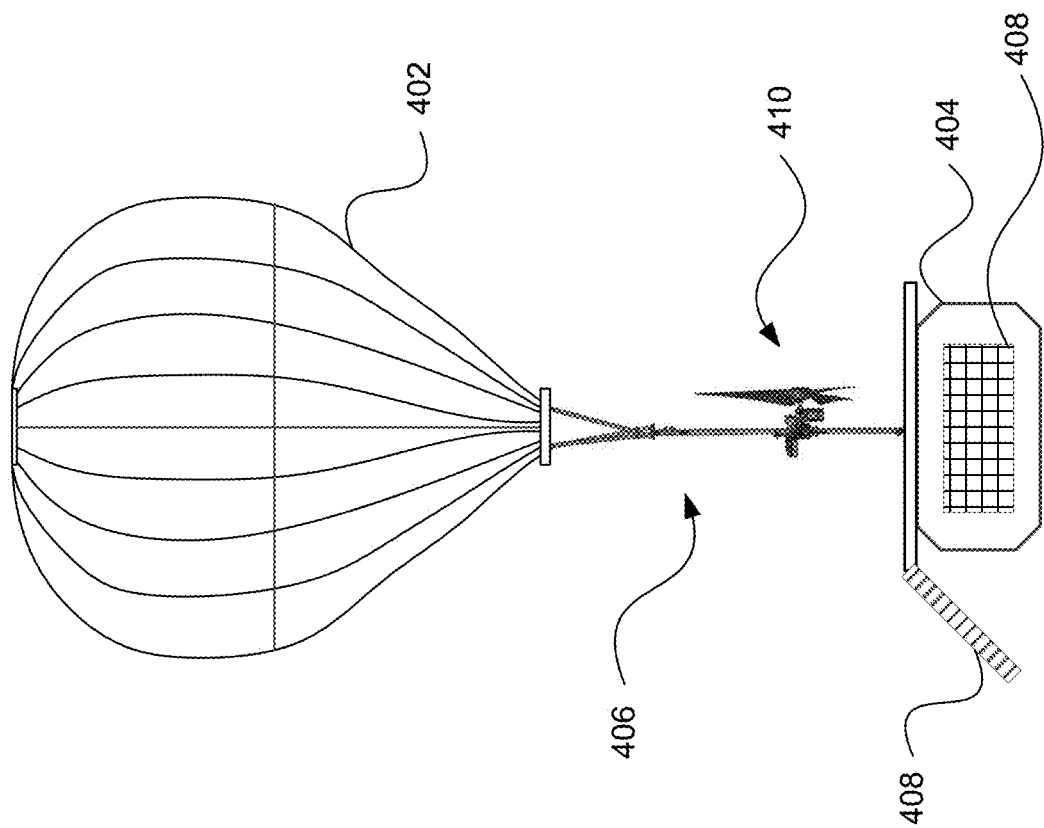
FIG. 4 is an example of a balloon platform with lateral propulsion in accordance with aspects of the disclosure.

In order to affect lateral position and/or velocity changes, the platform includes a lateral propulsion system. FIG. 4 illustrates one example configuration 400 of a balloon-type HAP with propeller-based lateral propulsion, which may represent any of the balloons or other lighter-than-air craft of FIG. 1. As shown, the example 400 includes an envelope 402, a payload 404 and a down connect member 406 configured to couple the envelope 402 and the payload 404 together. Cables or other wiring between the payload 404 and the envelope 402 may be run within or along the down connect member 406. One or more solar panel assemblies 408 may be coupled to the payload 404 or another part of the balloon platform. The payload 404 and the solar panel assemblies 408 may be configured to rotate about the down connect member 406 (e.g., up to 360° rotation or more), for instance to align the solar panel assemblies 408 with the sun to maximize power generation. Example 400 also illustrates a lateral propulsion system 410. While this example of the lateral propulsion system 410 is one possibility, the location could also be fore and/or aft of the payload section 404, or fore and/or aft of the envelope section 402, or any other location that provides the desired thrust vector. Details of the lateral propulsion system 410 are discussed below.

Example Configurations

Figure 5B:
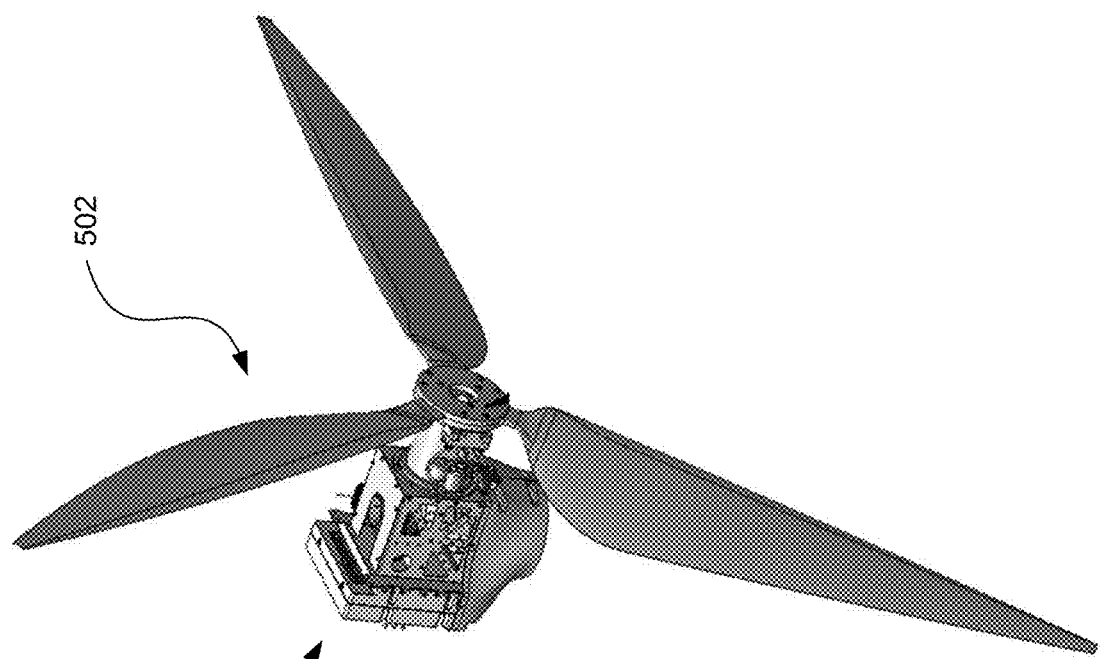
FIGS. 5A-B illustrate an example lateral propulsion system according to aspects of the technology.
Figure 5A:
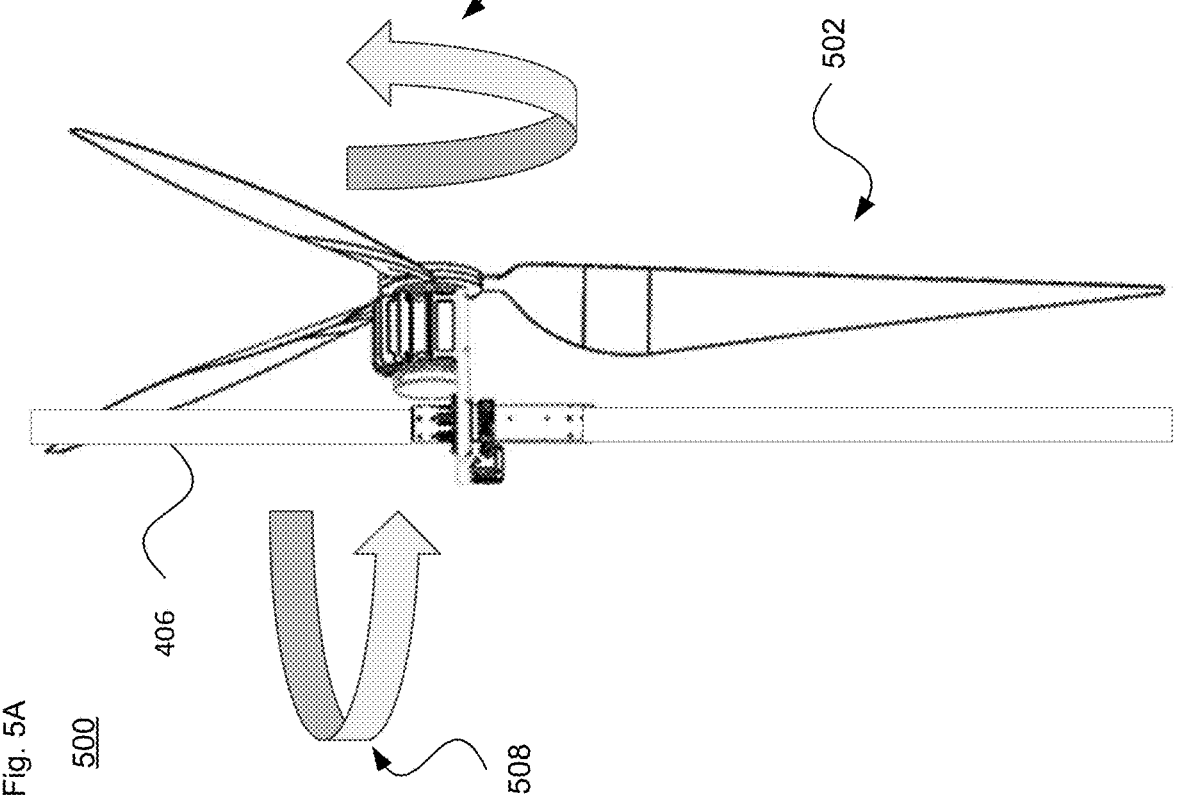

FIG. 5A illustrates an example 500 of the lateral propulsion system 410 of FIG. 4. Example 500 includes a propeller assembly 502 affixed to a control assembly 504, as shown in FIG. 5B. The control assembly 504 is configured to manage operation of the propeller assembly 502, including setting its pointing direction, speed of rotation and determining when to turn on the propellers and for how long. As shown in FIG. 5A, the three propeller blades of the propeller assembly 502 may be arranged generally parallel to the down connect member 406. While three propeller blades are shown, two or more propeller blades may be employed. The propellers are able to rotate in either a clockwise or counterclockwise direction as shown by arrow 506. The control assembly 504 is able to rotate the propeller assembly about a longitudinal axis of the down connect member 406 (e.g., up to or more than 360° rotation) as shown by arrow 508, changing the pointing direction of the propeller assembly 502 in order to change the HAP's heading.

While this configuration or other similar configurations gives the lateral propulsion system 410 two degrees of operational freedom, additional degrees of freedom are possible with other pointing mechanisms or air-ducting mechanisms. This flexible thrusting approach may be used to help counteract continually changing wind effects. Rotation of the control assembly 504 and propeller assembly 502 about the down connect member 406 is desirably independent of rotation of the solar panel assemblies (and/or payload) about the down connect member 406.

Figure 6A:
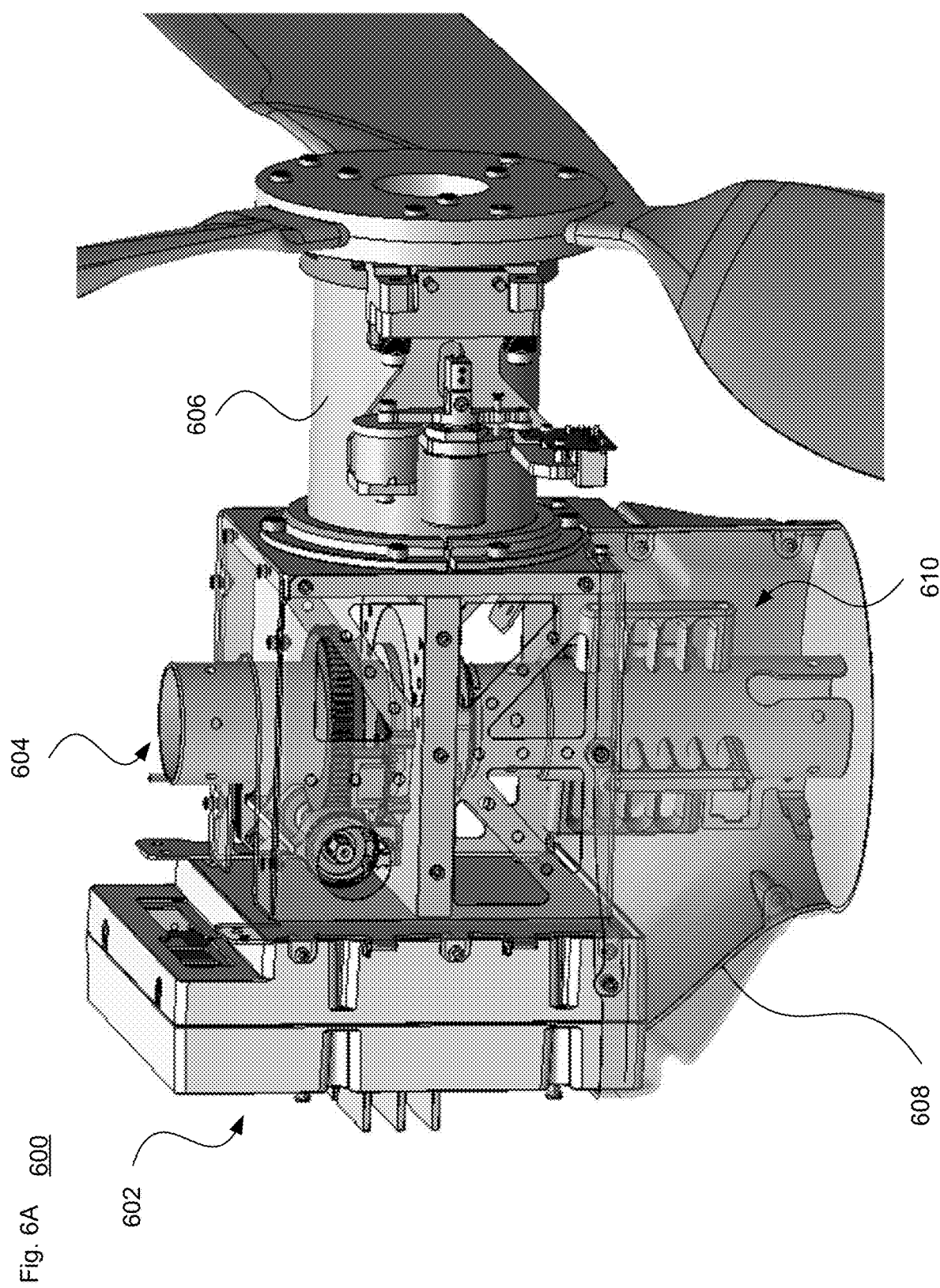
Figure 6B:
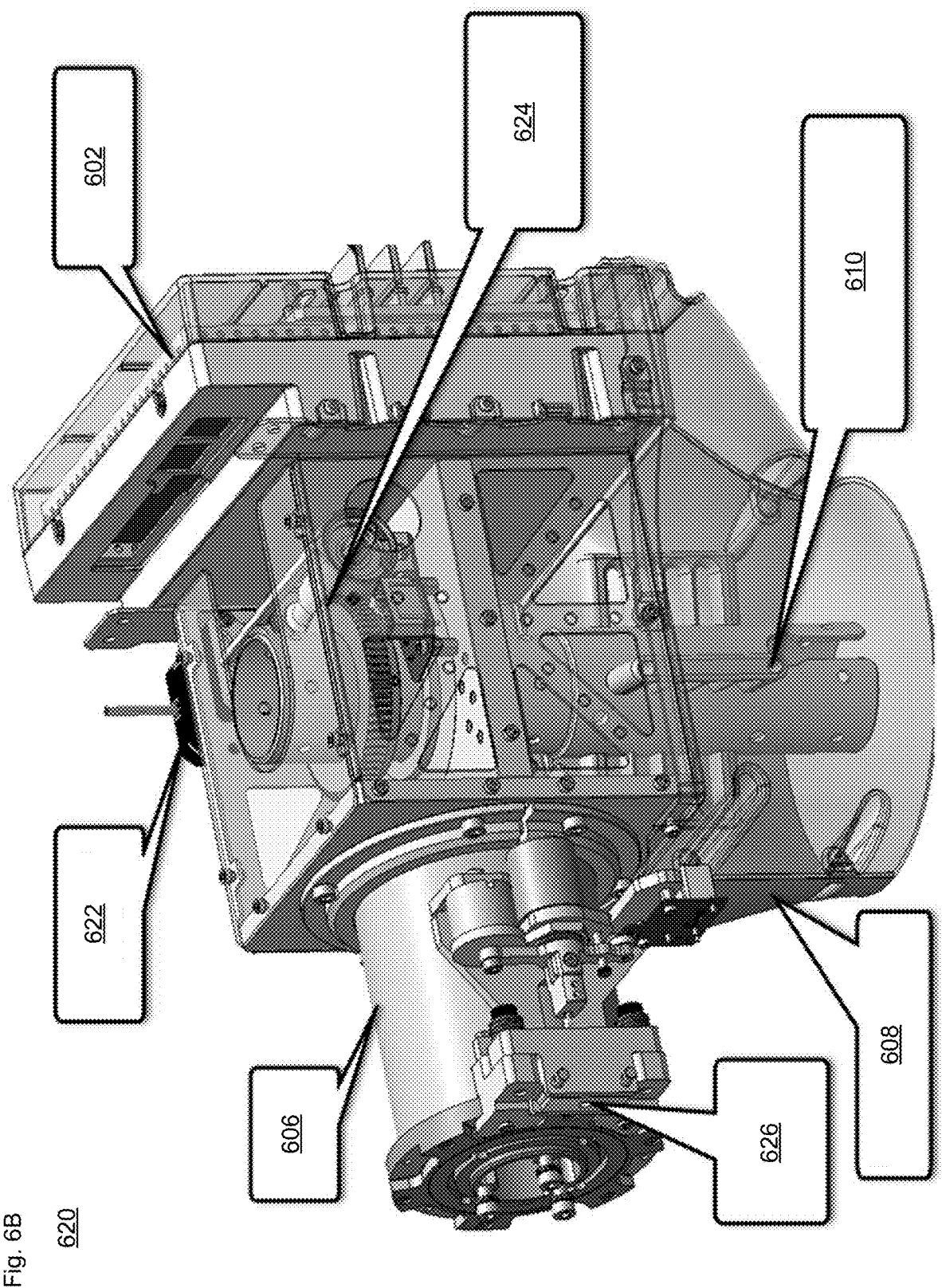

FIGS. 6A-C provides enlarged views 600, 620 and 640, respectively, of the control assembly 504. The control assembly may include an electronics module 602 for controlling operation of the assembly, a coupling section 604 that may be part of or otherwise connected to the down connect member, and a propeller motor assembly 606. As shown, an outer cover or shroud 608 may encompass a cable management structure 610, which is part of or secured to the coupling section 606. Power and data cables can be run through the cable management structure 610, for example connecting the electronics module 602 and other components of the lateral propulsion system to a power supply and/or control system of the payload. The cable management structure 610 is configured for power and/or data cables to be placed in a helical arrangement, with the ability to flex over a wide rotation range of the control assembly and propeller assembly, e.g., up to 360°-400° or more, while providing data/power to the lateral control system.

The payload or the lateral propulsion system (or both) may have on-board sensors (e.g., differential GPS or DGPS) to provide accurate attitude and/or position and velocity measurements, enabling highly accurate pointing of the propeller in an absolute direction as well as relative to the payload direction. These sensors are also able to provide measurement of the balloon platform's lateral speed. The propeller motor assembly 606 is configured to rotate the propeller in a clockwise or counterclockwise direction, with or without additional gearing. The propeller motor assembly 606 may be brushless, which can generate more torque than a brush-type motor. By way of example, the brushless motor may be a 1000 W motor, which is capable of rotating the propeller at up to 2500 rpm or more. The motor may employ a cooling system, for instance using cooling fins or air ducts (not shown) to remove excess heat from the motor or electronics. The system may only need to drive the propeller to achieve a lateral speed relative to the ground of between 1-15 m/s in order to significantly increase the ability of the balloon to stay on or return to station. The speed may be dependent on the location of interest, wind currents at a particular location or altitude, season/time of year, time of day, and/or other factors.

As shown in FIG. 6B, there may be a pointing axis motor assembly 622 in addition to propeller motor assembly 606. The pointing motor assembly 606 is configured to cause the control assembly and propeller assembly to rotate about the down connect member. This may be done by actuating a worm gear mechanism 624. For instance, the pointing motor assembly 606 may include a stepper or brushless DC motor that drives the worm gear mechanism 624, which enables the assembly to rotate about the down connect member by up to 360°-400° or more. Rotation and pointing of the propeller unit could be accomplished with many different configurations of motors and gears or other mechanisms. Also shown in this figure is a braking mechanism 626, which can be used to stop rotation of the propeller.

As shown in FIG. 6C, the electronics module 602 may include a control subsystem 642 and a power subsystem 644. A position sensor 646 may be part of the position motor assembly 606, to determine a relative alignment of the propeller assembly relative to the down connect member. Adjacent to the propeller motor assembly 606 is the braking mechanism 626, which may include a brake unit 648, a brake sensor 650, a holding magnet 652 and an actuator such as solenoid 654. These and other features of the brake mechanism 626 are discussed further below.

Figure 7:
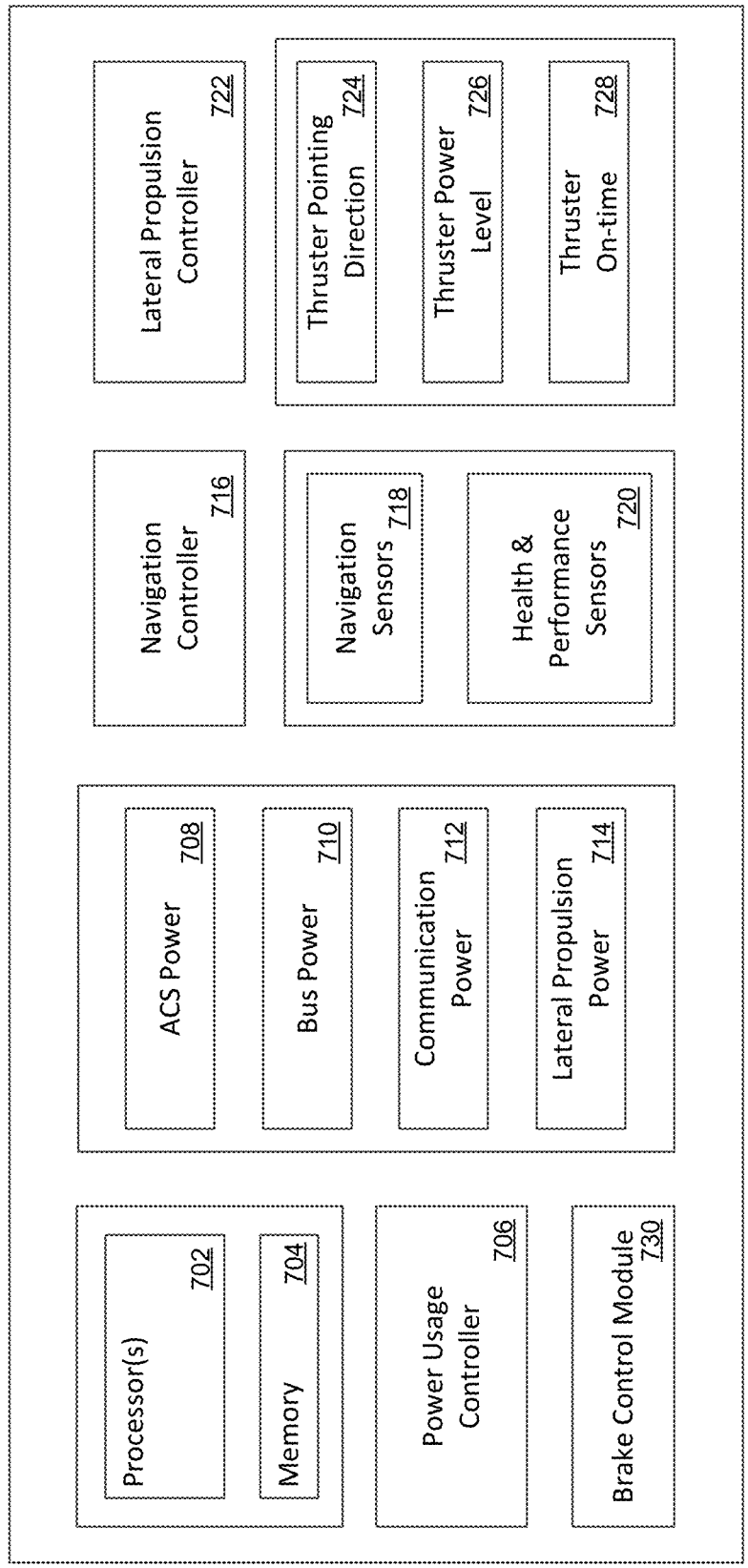
FIG. 7 is a block diagram of an example electronics module in accordance with aspects of the disclosure.

A block diagram of an exemplary electronics module 700 is illustrated in FIG. 7. The electronics module may be part of or separate from the navigation system 316 or the control system 302 of the payload. As shown, a CPU, controller or other types of processor(s) 702, as well as memory 704, may be employed within the electronics module 700 to manage aspects of the lateral propulsion system. The power subsystem may include a power usage controller 706 for managing various power subsystems of the electronics module, including for altitude control system (ACS) power 708 (e.g. to control buoyancy of the envelope), bus power 710, communication power 712 and lateral propulsion power 714. The power usage controller 706 may be separate from or part of the processor(s) 702.

The control subsystem may include a navigation controller 716 that is configured to employ data obtained from onboard navigation sensors 718, including an inertial measurement unit (IMU) and/or differential GPS, received data (e.g., weather information), and/or other sensors such as component health and performance sensors 720 (e.g., a force torque sensor) to manage operation of the balloon's systems. The navigation controller 716 may be separate from or part of the processor(s) 702. The navigation controller works with system software, ground controller commands, and health & safety objectives of the system (e.g., battery power, temperature management, electrical activity, etc.) and helps decide courses of action. The decisions based on the sensors and software may be to save power, improve system safety (e.g., increase heater power to avoid systems from getting too cold during stratospheric operation) or divert power to altitude controls or divert power to lateral propulsion systems.

When decisions are made to activate or make adjustments to the lateral propulsion system, the navigation controller then leverages sensors for position, wind direction, altitude and power availability to properly point the propeller and to provide a specific thrust condition for a specific duration or until a specific condition is reached (e.g., a specific lateral velocity or position is reached, while monitoring and reporting overall system health, temperature, vibration, and other performance parameters). In this way, the navigation controller can continually optimize the use of the lateral propulsion systems for performance, safety and system health. Upon termination of a flight or indication of an emergent condition, the navigation controller can engage the safety systems (for example the propeller braking mechanism) to prepare the system to descend, land, and be recovered safely.

Lateral propulsion controller 722 is configured to selectively control the propeller's pointing direction, manage speed of rotation, power levels, and determine when to turn on the propeller or off, and for how long. The lateral propulsion controller 722 thus oversees thruster pointing direction 724, thruster power level 726 and thruster on-time 728 modules. It can also manage a brake control module 730 to engage and/or disengage the braking mechanism. The lateral propulsion controller 722 and/or the brake control module may each be separate from or part of the processor(s) 702. Processor software or received human controller decisions may set priorities on what power is available for lateral propulsion functions (e.g., using lateral propulsion power 714). The navigation controller then decides how much of that power to apply to the lateral propulsion motors and when (e.g., using thruster power level 726). In this way, power optimizations occur at the overall system level as well as at the lateral propulsion subsystem level. This optimization may occur in a datacenter on the ground or locally onboard the balloon platform.

The lateral propulsion controller 722 is able to control the drive motor of the propeller motor assembly so that the propeller assembly may operate in different modes. Two example operational modes are: power control or rotational velocity control. The electronics module may store data for both modes and the processor(s) of the control assembly may manage operation of the drive motor in accordance with such data. For instance, the processor(s) may use the stored data to calculate or control the amount of power or the rotational propeller velocity needed to achieve a given lateral speed. The electronics module may store data for the operational modes and the processor(s) of the control assembly may manage operation of the drive motor in accordance with such data. For instance, the processor(s) may use the stored data to calculate the amount of current needed to achieve a given lateral speed. The processor(s) may also correlate the amount of torque required to yield a particular speed in view of the altitude of the balloon platform.

The processor(s) may control the drive motor continuously for a certain period of time, or may cycle the drive motor on and off for selected periods of time, e.g., using pulse width modulation (PWM). This latter approach may be done for thermal regulation of the drive motor. For instance, the propeller may be actuated for anywhere from 1 second to 5 minutes (or more), and then turned off to allow for motor cooling. This may be dependent on the thermal mass available to dissipate heat from the motor.

As noted above, the lateral propulsion controller 722 regulates the thruster pointing direction 724, such as by causing the pointing motor assembly to drive the worm gear mechanism in a first direction to rotate clockwise about the down connect longitudinal axis or in a second direction to rotate counterclockwise about the longitudinal axis.

Figure 8:
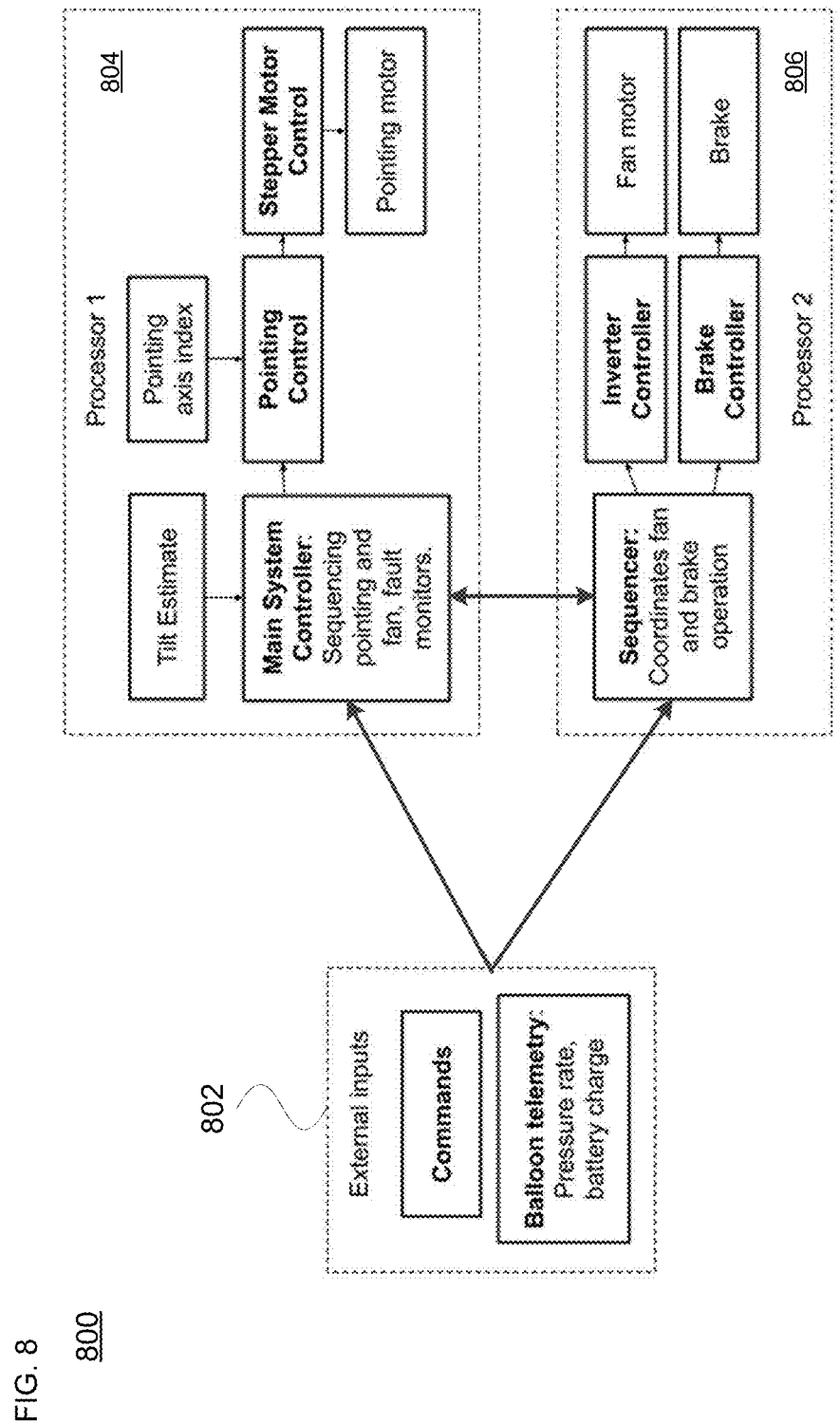
FIG. 8 illustrates an exemplary lateral propulsion controller arrangement in accordance with aspects of the technology.

FIG. 8 illustrates a view 800 of an exemplary functional implementation of the lateral propulsion controller. In this example, external inputs 802, such as control commands and/or balloon telemetry information (e.g., pressure rate, battery charge, etc.) are received and provided to one or more processors of the electronics module. For instance, a first processor 804 may control operation of the pointing axis motor assembly and a second processor 806 may control operation of the propeller motor assembly, which may include controlling operating of the braking mechanism via the brake control module.

By way of example, a pointing control module may receive a pointing axis index, which can indicate the pointing position of the propeller relative to the down connect member, how many degrees of rotation the propeller has moved relative to a default position, etc. In this example, such information is used by a stepper motor control module to control operation of the pointing axis motor assembly, for instance by rotating in a clockwise (or counterclockwise) direction once a threshold rotation amount has been exceeded (e.g., 320°) or a maximum rotation amount has been reached (e.g., 360° or 400°).

Figure 9:
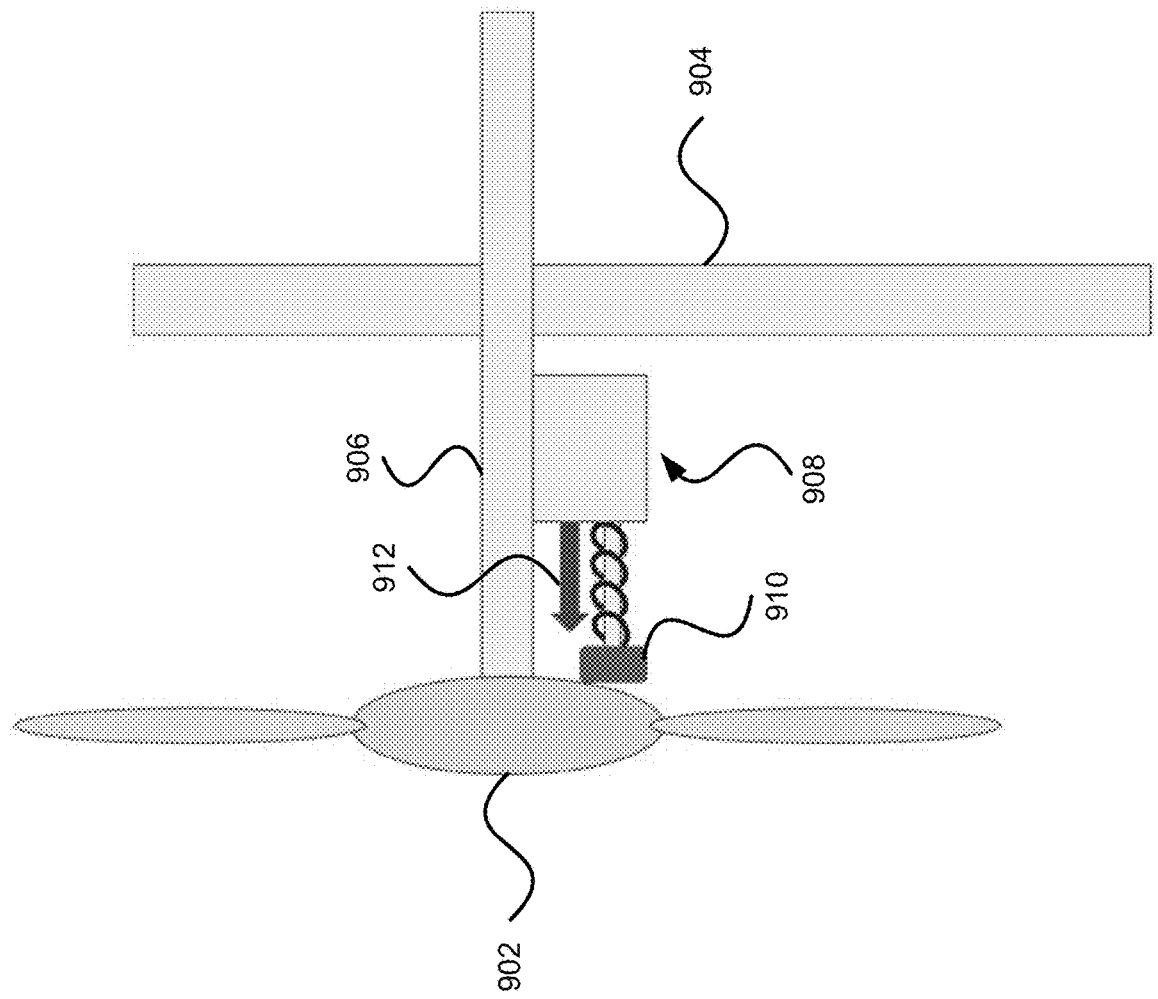
FIG. 9 illustrates a braking example in accordance with aspects of the disclosure.

FIG. 9 illustrates a braking example 900 using the brake control module. As shown, hub 902 of the propeller assembly is coupled to a down connect member 904 of the HAP via a transverse section 906, which may include the propeller motor assembly. The brake mechanism 908 includes a brake pad 910. As indicated by arrow 912, the brake pad 910 can be driven towards the hub 902, using friction braking to cause the propeller assembly to stop rotating. The braking mechanism can be disengaged, and the braking process repeated as needed during the operational lifetime of the HAP. Further details of the brake mechanism and brake operation are discussed below.

Brake Mechanism

Figure 10A:
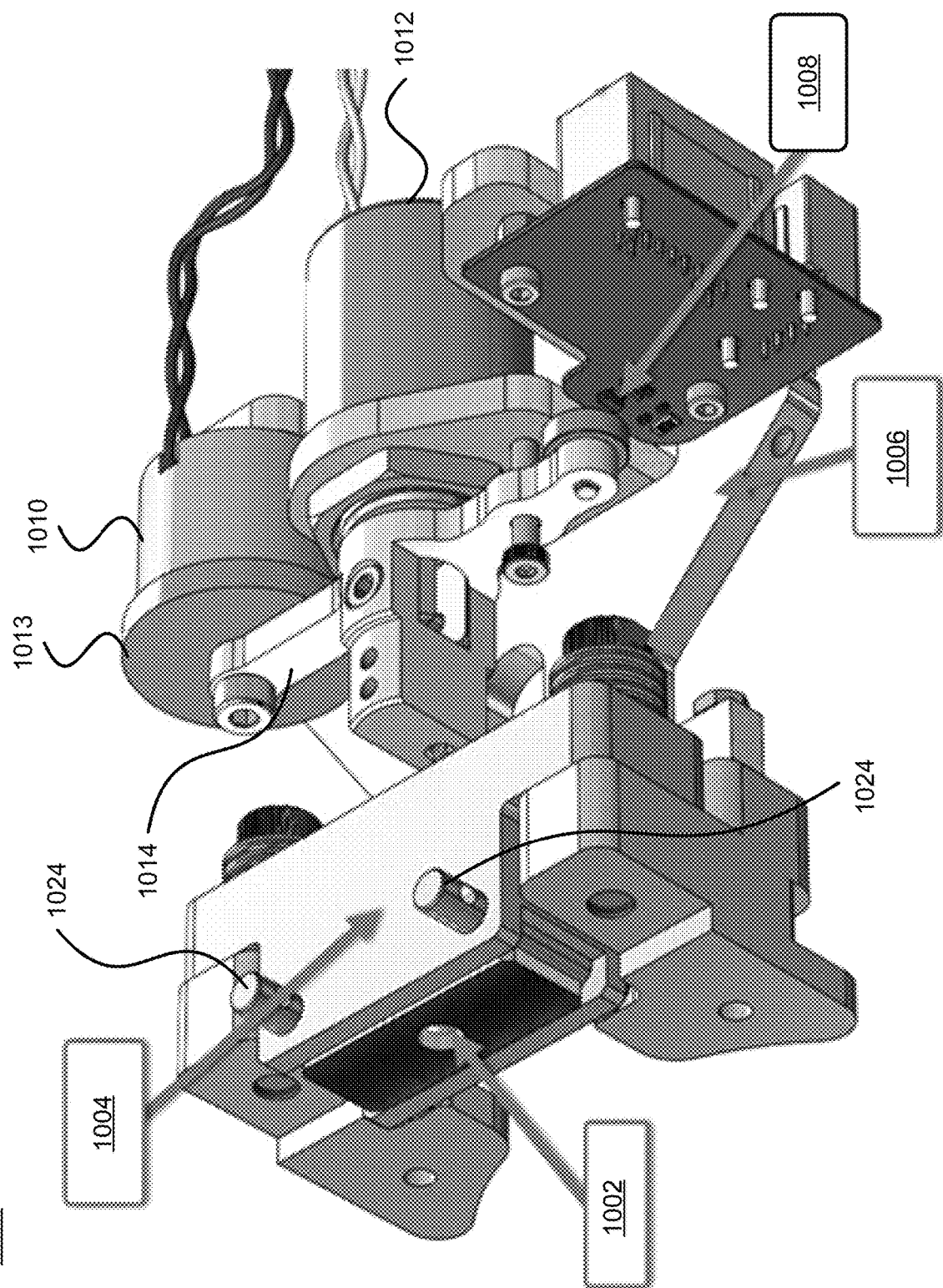
FIGS. 10A-C illustrate a brake mechanism in accordance with aspects of the disclosure.
Figure 10C:
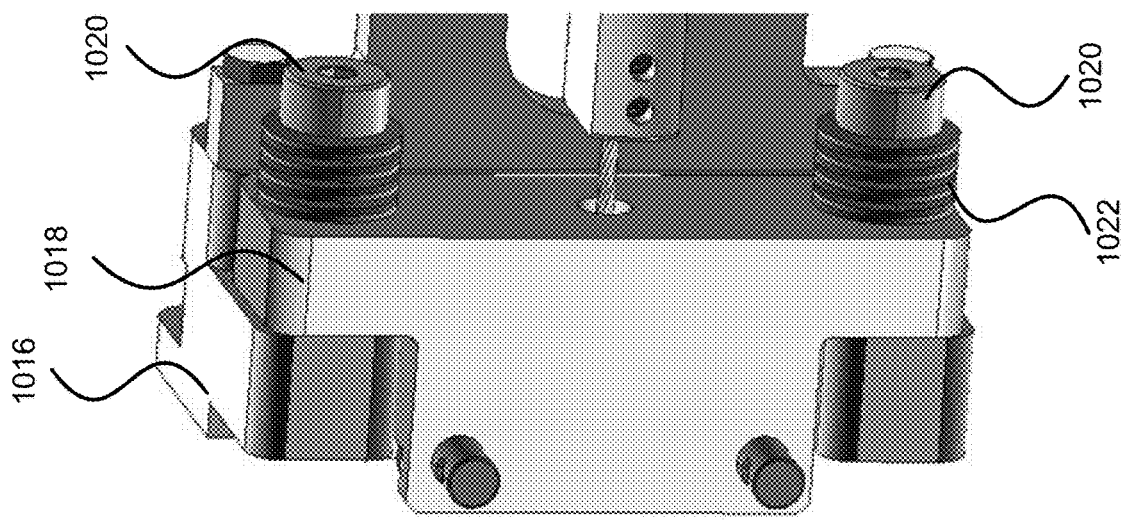
Figure 10B:
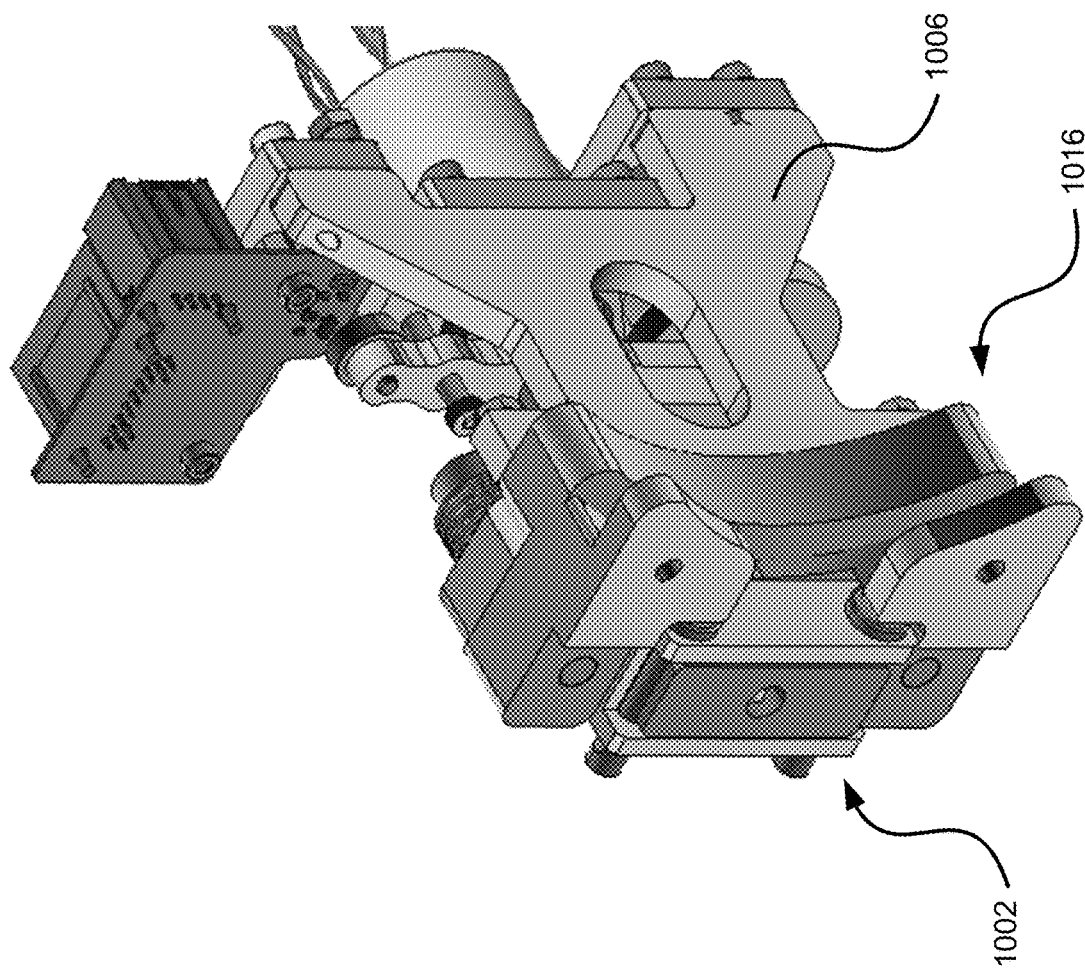

FIGS. 10A-C illustrate one example 1000 of a brake mechanism that may be used to rapidly bring the propeller assembly to a stop. The propeller assembly and propeller motor assembly (as seen in FIGS. 6A-C) are omitted for clarity. As shown in FIG. 10A, brake pad 1002 is received within a housing 1004. The brake pad 1002 is configured to linearly extend from the housing 1004 (see arrow 912 of FIG. 9) in order to contact the propeller hub to stop the rotation of the propeller assembly. The housing 1004 is coupled to support member 1006. Also coupled to the support member are a brake sensor 1008, a holding magnet 1010 and an actuator such as solenoid 1012. An arm member 1014 operatively couples the holding magnet 1010 and solenoid 1012 to the brake pad 1002. Armature plate 1013 is shown as a round disc sandwiched between the holding magnet 1010 and the arm member 1014.

As seen in FIG. 10B, the housing 1004 includes a housing bracket 1016 having an arcuate side, which is configured to mount adjacent to the cylindrical housing of the propeller motor assembly. And as seen in the view of FIG. 10C, a top (cover) section 1018 of the housing 1004 is affixed to the housing bracket 1016 using a pair of bolts 1020. One or more washers 1022 may be used as spacers between the bolt head and the top section of the housing. By way of example, the washers 1022 may be Belleville washers, which are conical springs that are extremely stiff compared to traditional coil springs. The washers' purpose is twofold. The first is to make the brake force ramp up instead of occurring suddenly. The second is that the washers will increase the gap between the housing 1004 and the housing bracket 1016 until the gap is too large and force will stop increasing. A set of Belleville washers 1022 may be stacked all in the same direction or with adjacent washers in opposing directions. Returning to FIG. 10A, a pair of pins 1024 (e.g., clevis pins) are shown affixed to the housing 1004. The clevis pin will reach the radius on 1002 and force drop off. This is essentially a force limiter that prevents torque from going over a set value.

Figure 11A:
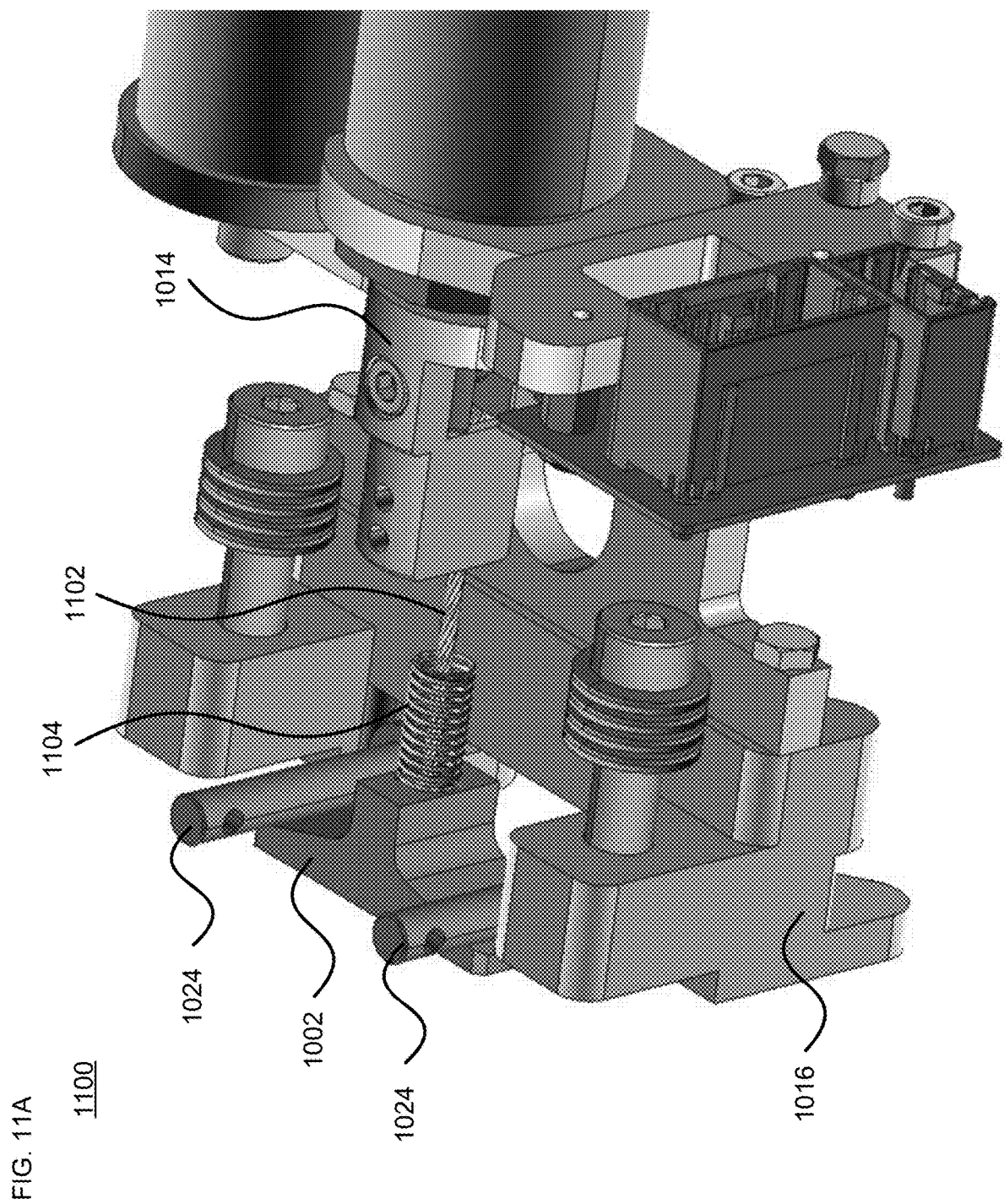
Figure 11B:
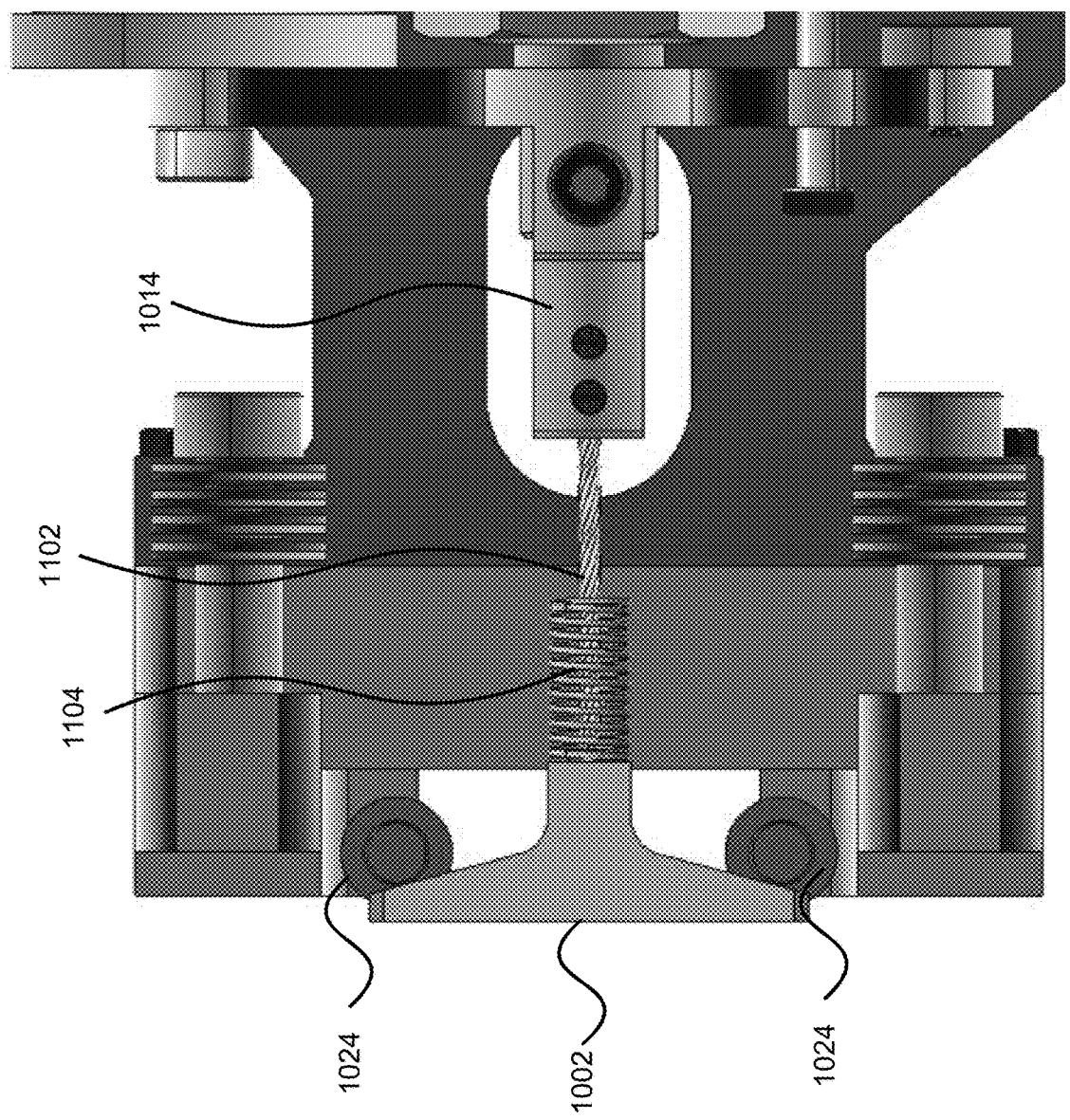

FIGS. 11A-B illustrate a configuration 1100 of the brake mechanism of FIG. 10, but with the top of the housing 1004 removed. As shown in the perspective view of FIG. 11A and the top view of FIG. 11B, the arm member 1014 is coupled to the brake pad 1002 via a cable 1102. A spring 1104 is disposed along the cable 1102 between the brake pad 1002 and the arm member 1014. The spring 1104 provides a small amount of force normal to the propeller hub. When the holding magnet is released, the spring ensures the brake pad makes contact with the hub. Once the pad 1002 contacts the hub with a relatively small amount of normal force (from the spring), the friction between the pad and the hub will cause the pad to move in the direction of the hub rotation and then bind against one of the pins 1024, which are rolling member.

Figure 11D:
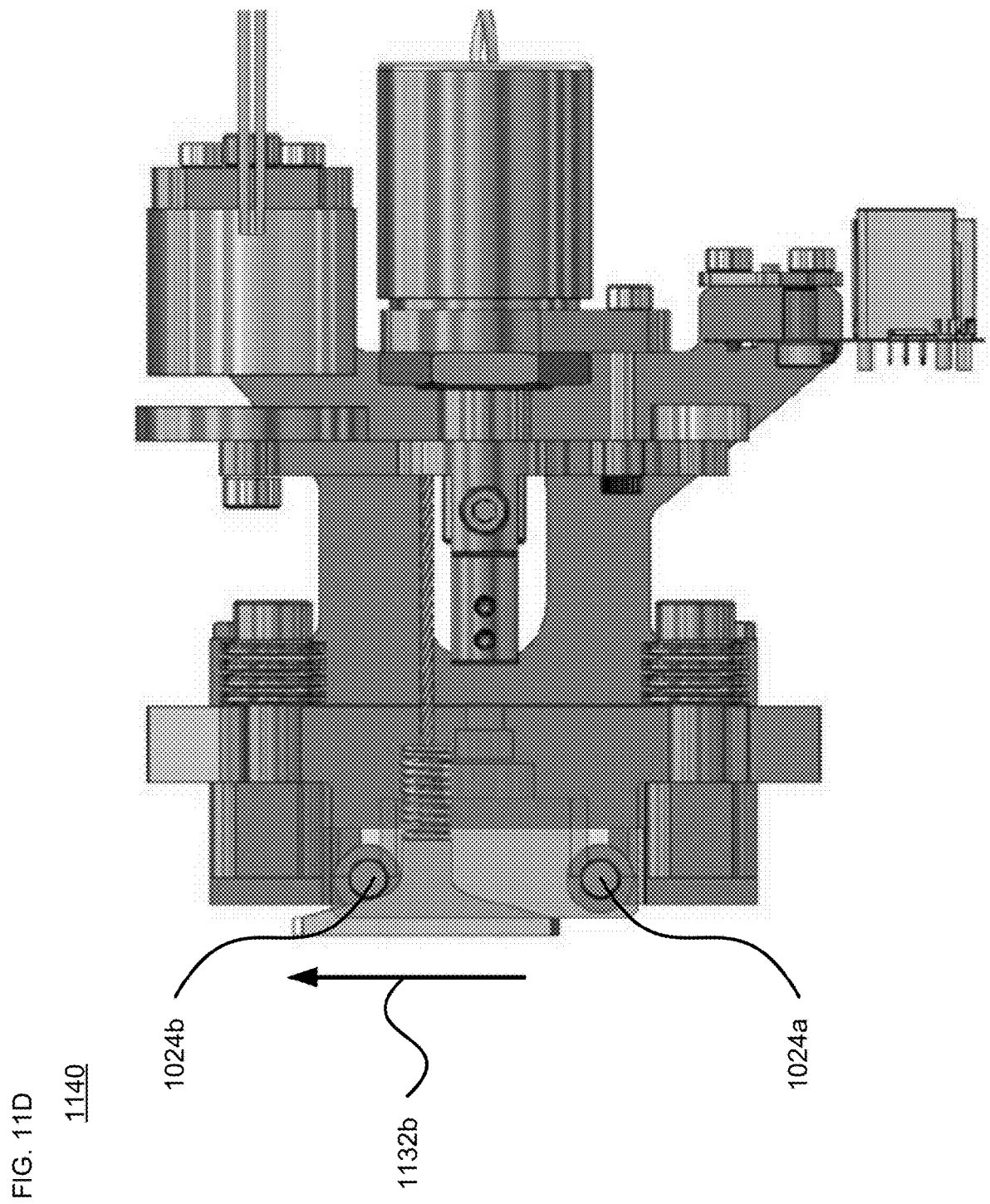
Figure 11E:
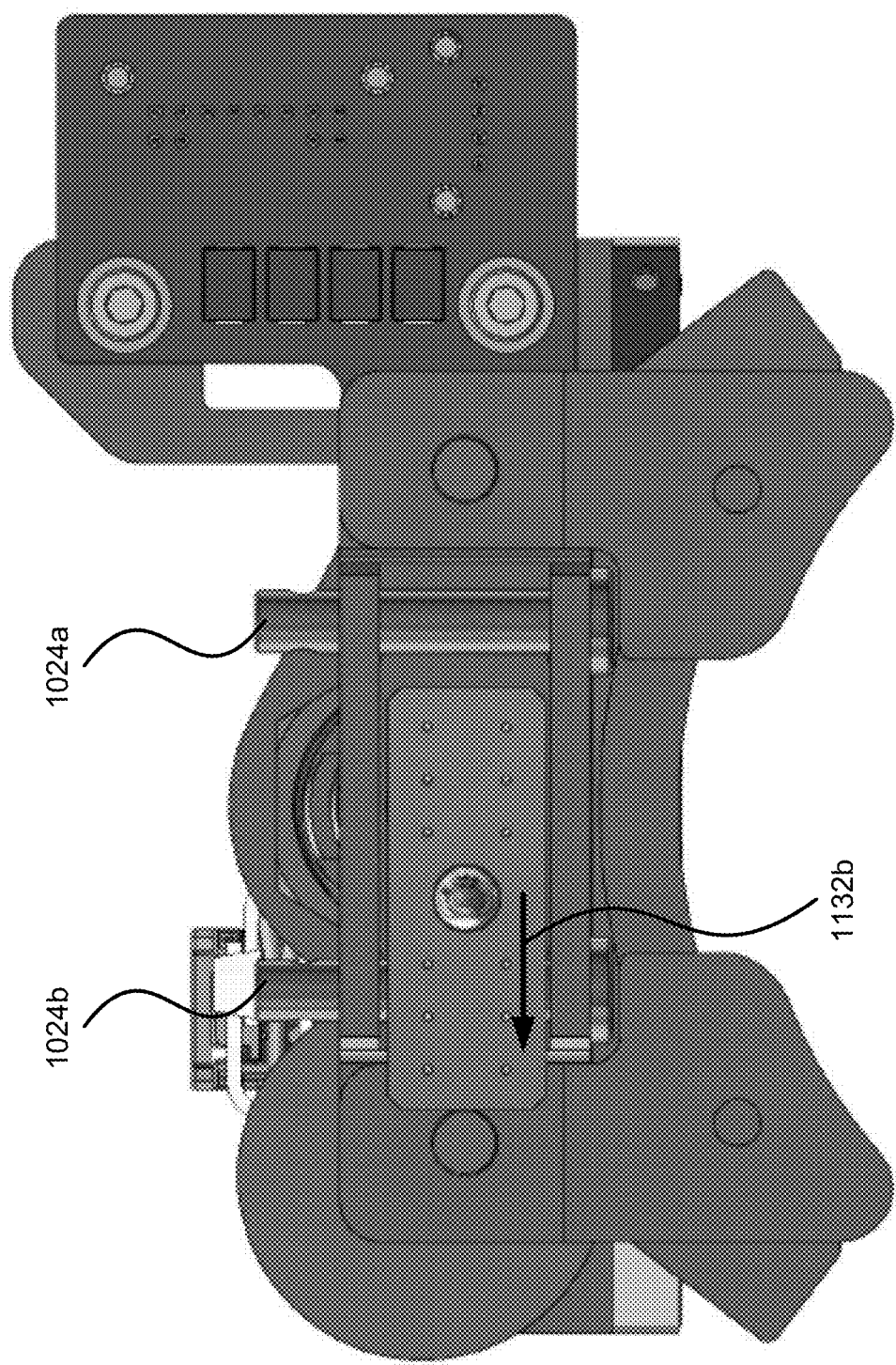

Thus, as shown in the cutaway view 1130 of FIG. 11C, the pad will either move in a first lateral direction as indicated by dashed arrow 1132 a along a first one of the pins 1024 a, or move in a second lateral direction as indicated by solid arrow 1132 b along a second one of the pins 1024 b. The partial see-through view of FIG. 11D illustrates a situation 1140 when the pad has moved to the second pin 1024 b. FIG. 11E is a head-on view showing the pad moved to the second pin 1024 b. The lateral displacement of the pad may be, e.g., on the order of 0.25 to 1.5 inches, or more or less depending on the size of the arrangement. Once the angled surface of the pad has bound (wedged) between the rotating hub and one of the pins, the normal braking force applied to the hub is proportional to the wedge angle of the brake pad, friction between the brake pad and the hub, and the kinetic energy of the spinning propeller assembly. The pins 1024 help re-align the pad to a centered position once the brake is disengaged.

Figure 11F:
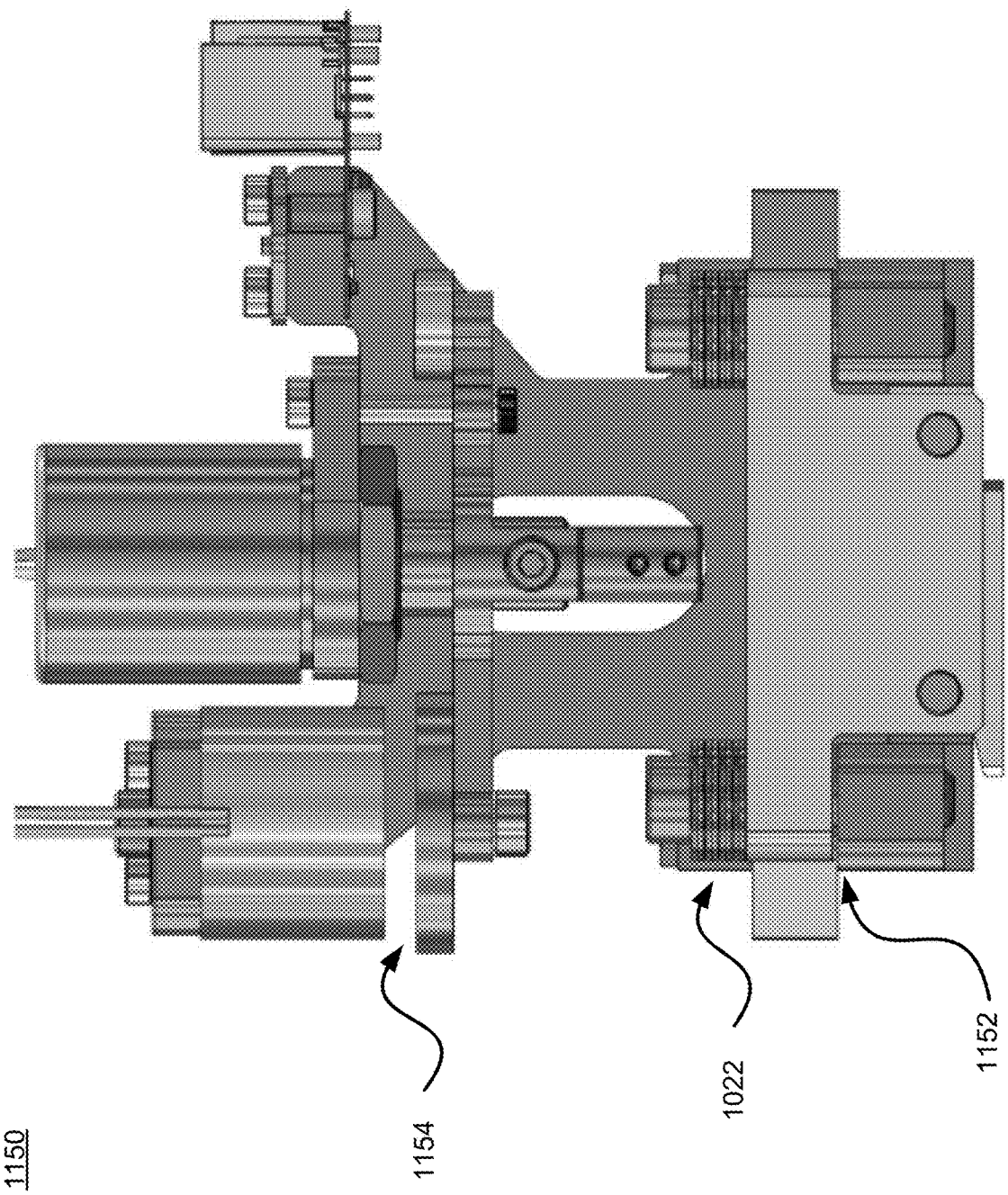
Figure 11G:
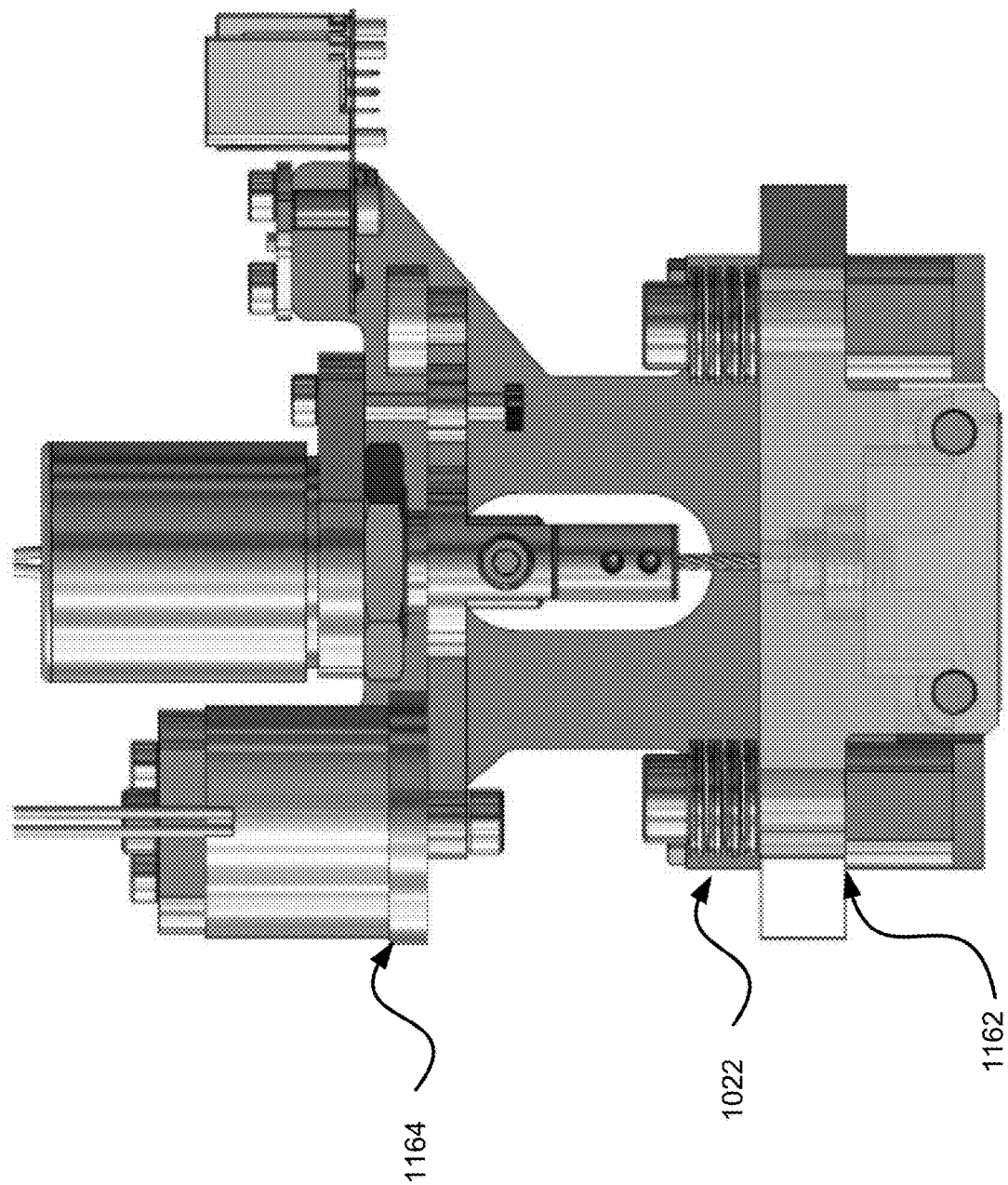

FIG. 11F illustrates a view 1150 in which the pad has been laterally displaced for engagement with the hub (not shown). Here, the Belleville washers 1022 are in a compressed state, and there are gaps 1152 and 1154 between certain components (for 1154, this is a gap between the armature plate 1013 and the holding magnet 1010). In contrast, as seen in view 1160 of FIG. 11G, when the pad has been disengaged, the Belleville washers 1022 are in an uncompressed state. In this case, there is no gap between the components as indicated by arrows 1162 and 1164.

Figure 12:
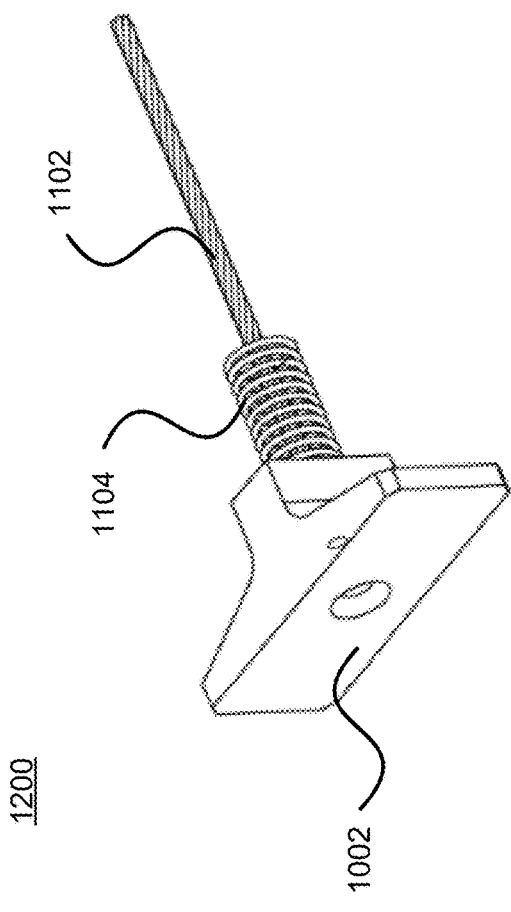
FIG. 12 illustrates a brake pad arrangement in accordance with aspects of the technology.

FIG. 12 illustrates a view 1200 showing the brake pad 1002, cable 1102 and spring 1104 in isolation. The surface area and shape of the brake pad contact surface may be chosen based on the configuration of the propeller hub, the amount of braking force desired, and other factors. The braking surface of the brake pad can be smooth, rough or grooved. For instance, a rough surface may have pits and raised portions. The different surface types may not have a noticeable impact on the braking process, but may affect galling and friction between the brake pad and the propeller hub. In certain implementations it may be beneficial to minimize or avoid galling.

Figure 13:
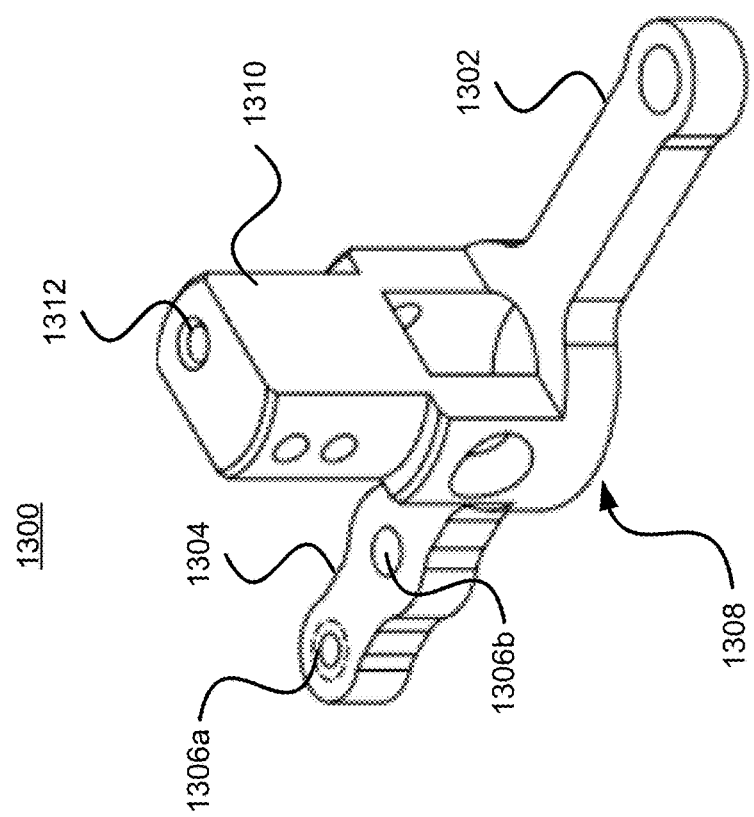
FIG. 13 illustrates an arm member in accordance with aspects of the technology.
Figure 14:
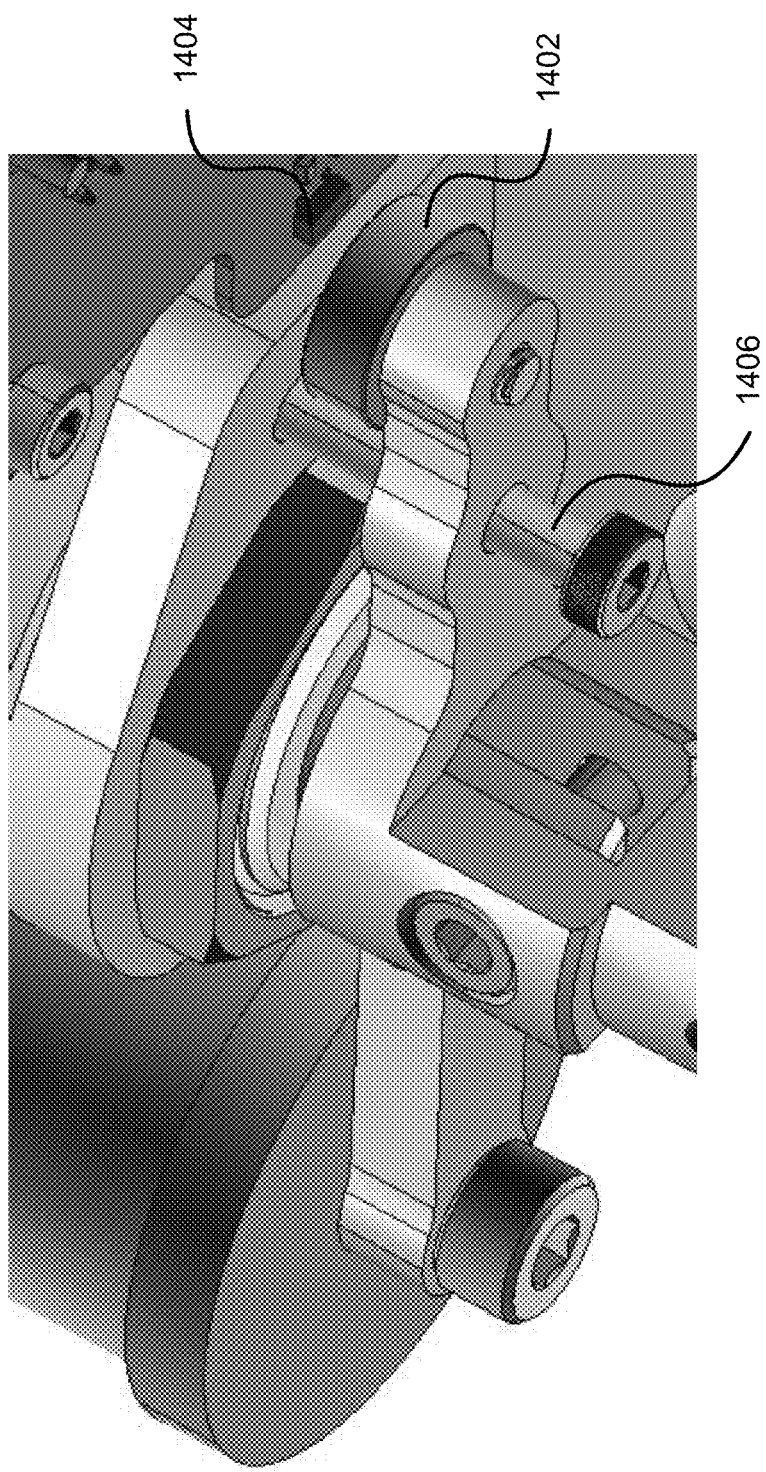
FIG. 14 illustrates a portion of a brake mechanism in accordance with aspects of the technology.

FIG. 13 illustrates an example 1300 of the arm member 1014. As shown, the arm member in this example includes a first extension 1302 that couples to the holding magnet and a second extension 1304 that has a first receptacle 1306 a for a magnet used as part of the brake sensor and a second receptacle 1306 b. Between the two extensions is a central region 1308, which couples to the solenoid. Extending from the central region 1308 is an arm 1310, which includes a receptacle 1312 that receives the cable 1102. And as shown in view 1400 of FIG. 14, magnet 1402 is affixed to receptacle 1306 a. A sensor 1404, such as a Hall Effect sensor, is slightly spaced apart from the magnet 1402 to detect a strength of the magnetic field, which is used to detect a relative displacement of the arm member 1404. A pin, bar or other shaft-type element 1406 is partly disposed in the receptacle 1306 b. The arm member slides on the shaft element 1406, which is used to keep the arm assembly aligned with the solenoid, holding magnet and Hall Effect sensor. The cable 1102 that connects the arm assembly to the brake pad is intentionally flexible, thereby allowing the brake pad to move laterally in the direction of hub rotation to bind against the pin as discussed above. The lateral movement of the brake pad places a small lateral load on the arm, which the shaft element 1406 resists. Maintaining axial alignment of the solenoid plunger and coil winding may be important so that the solenoid plunger does not bind on the solenoid housing when the solenoid is activated to disengage the brake Brake Operation During normal operation of the propeller, the brake pad is disengaged from the propeller hub so that the propeller may provide lateral propulsion to the HAP. Upon determination of descent of the HAP, uncontrolled propeller rotation, power loss or situations when the propeller is not being used, the system causes the brake pad to engage with the propeller hub. In this configuration, power is applied to the system when the brake pad is disengaged. In the event of power loss, the brake system is automatically engaged According to one aspect of the technology, the magnet 1402 and Hall Effect sensor 1404 are used to detect whether the brake pad is engaged with the propeller hub. The actuation distance between the magnet and sensor is small, and an analog feedback signal from the sensor provides a controller (e.g., processor 806 of FIG. 8) with a distance delta that is used to determine whether or not the brake is engaged. In some examples, the distance may be, e.g., on the order of 1-2 mm, less than 10 mm, etc. For instance, in one scenario the distance between the surface of the brake pad and the hub is between 0.75-1.5 mm in the disengaged state and 0 mm for the engaged state. Other techniques could alternatively be used to detect whether the brake pad is engaged with the hub, such as evaluating a motor status signal.

In an alternative configuration, an electromagnet may be employed to detect brake engagement. Here, the magnetic field of an energized electromagnet would change depending on if a ferrous material is in contact with it or not. In this case, the Hall Effect sensor would be placed where the highest delta in the magnetic field occurs, and the controller could detect whether or not the electromagnet is engaged with the armature plate (1013 in FIG. 10*a*) holding the brake pad back.

As noted above, according to one scenario the brake is always engaged when the propeller system is idle. Here, brake would only be disengaged when the propeller is running. Thus, applications of the braking system always assume the propeller is currently spinning. The brake mechanism may be actuated to stop the propeller assembly in different ways. In one example, actuation logic of the controller responds to changes in pressure events, tilt, and overspeed of the motor. For instance, the braking logic may map certain conditions to severity of the braking response. Some examples include (i) high tilt angle of the balloon envelope (e.g., in excess of 10-30 degrees of tilt, or more or less), (ii) high change in ambient pressure (e.g., in excess of a 10-25% change in pressure), (iii) moderate fan (propeller) overspeed (e.g., on the order of 5-20% overspeed or no more than 30% overspeed), and (iv) high fan (propeller) overspeed (e.g., on the order of 25-50% overspeed, at least 20% overspeed, etc.). For a high tilt condition, the propeller motor may be stopped and the brake is applied when the propeller has stopped spinning. For a high change in ambient pressure, the brake may be applied immediately. For moderate fan overspeed, the motor may be stopped and the brake applied when the propeller has stopped spinning. And for high fan overspeed, the brake may be applied immediately.

Figure 15A:
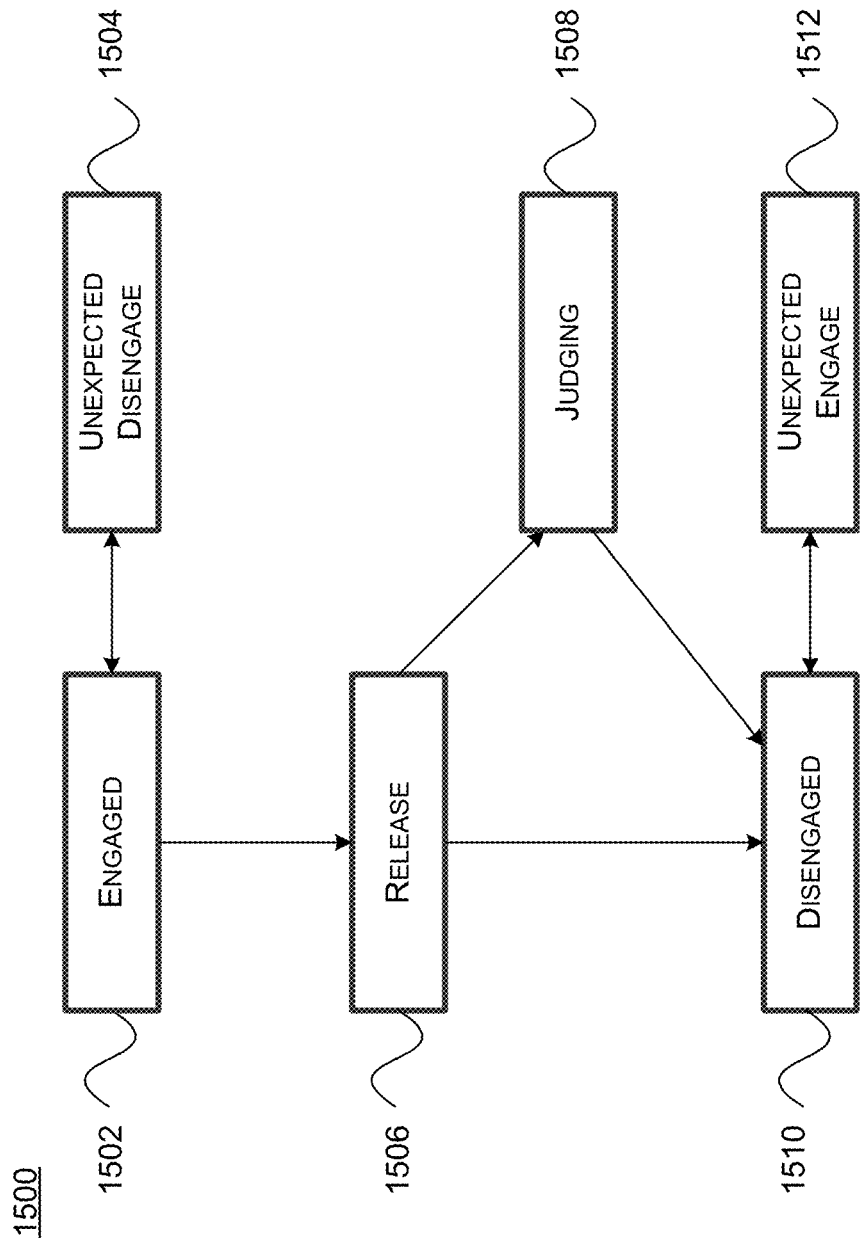
FIG. 15A-B illustrate state and flow diagrams of an engagement and disengagement approach in accordance with aspects of the technology.

FIG. 15A illustrates a state diagram 1500 showing different states of the braking process, for instance as performed by brake control module 730. Engaged state 1502 is when the brake is engaged with the propeller hub. The system may continuously or systematically monitor for unexpected disengagements in the unexpected disengage state 1504. Release state 1506 includes the process for releasing the brake, which can include energizing both the electromagnet and the solenoid. Judging state 1508 may include the system determining whether the brake has sufficiently pulled away from the hub, for instance so that the lateral propulsion system may be activated. Disengaged state 1510 is when the brake is fully disengaged from the hub so that the propeller can freely rotate for lateral propulsion. And the system may continuously or systematically monitor for unexpected engagements in the unexpected engage state 1512.

In another approach, information from the Hall Effect sensor may be used as follows. The Hall Effect sensor outputs of the motor increase in frequency as the motor speed increases. These sensor output can be feed into a counter that is reset periodically by an external real time clock event. When the counter exceeds a predefined maximum count rating before the periodic periodically reset, the brake power would be disengaged. Alternatively, the energy from each rising edge of the sensor outputs would be AC coupled and accumulated. Here, whenever the accumulation trips beyond a setpoint in a comparator, the comparator would toggle and disengage the brake power. In one scenario, power is disconnected and the brake is applied any time the propeller is not running, which saves power.

Prior to engagement, an actuation technique may be used to ensure the brake is disengaged. The first stage energizes the solenoid (1012 in FIG. 10A) to pull back the braking surface of the brake pad 1002 away from the propeller hub. The second stage de-energizes the solenoid 1012 and energizes the electromagnet 1010, which holds the braking surface from engaging. This provides a high steady state force to power ratio. When power to the magnet is turned off, the magnetic field collapses and the spring 1104 engages the brake pad 1002, causing the brake pad to contact the propeller hub.

Figure 15B:
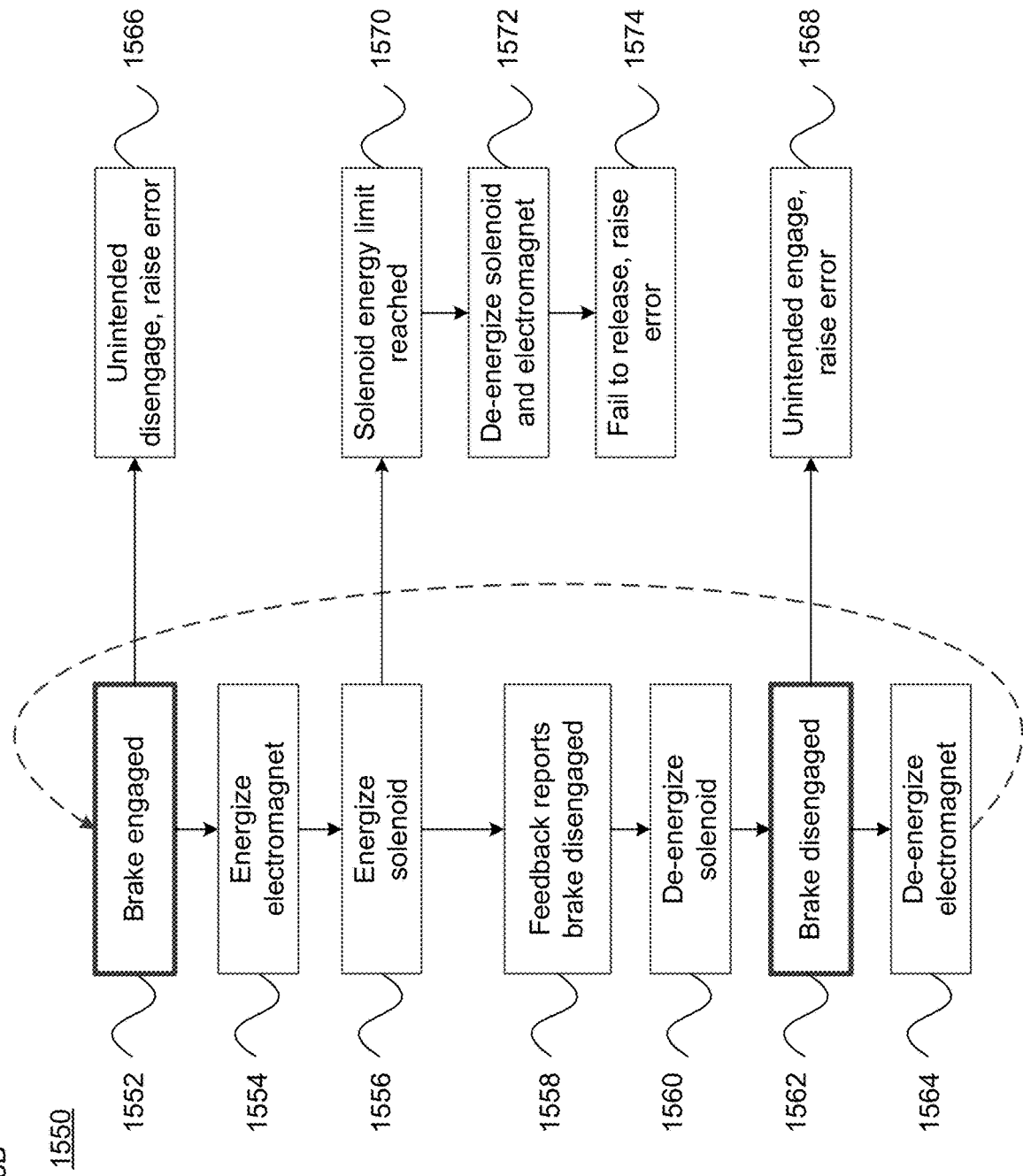

FIG. 15B illustrates an example 1550 of a brake disengagement actuation process that may be performed by brake control module 730, for instance based upon the lateral propulsion controller 722 planning to activate the propeller assembly. Block 1552 starts from the brake engaged state in which the brake pad physically arresting the propeller hub (the Engaged state). At block 1554, the electromagnet is first energized to allow time for the magnetic field to build up (part of the Release state). Then at block 1556, the solenoid is energized to pull back the brake pad from the propeller hub (part of the Release state). In one example, the solenoid may be energized with a substantially higher than rated power to save weight. The tradeoff to this approach is that the solenoid can only be actuated for a short duration before it must be powered off to cool down. If this time limit is hit before the brake feedback reports the brake pad is pulled back, the state would go to JUDGING, where solenoid is powered de-energized and a short time is allowed for the brake feedback to report it is pulled back. If it succeeded, the state would go to DISENGAGED, while if it failed, it would go back to ENGAGED and reports an error.

Next, at block 1558 the system waits for feedback to show the brake is pulled back (part of Release and Judging states).

Once feedback (e.g., from the Hall Effect sensor) shows the brake has been pulled back, the solenoid is de-energized at block 1560 (the Disengaged state). Then the brake is disengaged at block 1562, and the electromagnet is de-energized at block 1564. The process then is able to repeat as shown by dotted arrow from block 1564 to block 1552. There may also be a fallback operating mode for situations where the brake feedback path has failed. In this case, the solenoid is always actuated for the maximum duration, and every pull-back attempt is assumed to be successful.

Additionally, the firmware monitors for the brake engaging and disengaging without being commanded. For instance, block 1566 indicates that if there is an unintended or unexpected disengagement, an error signal may be raised. Similarly, block 1568 indicates that if there is an unintended or unexpected engagement, an error signal may also be raised. With regard to energizing the solenoid, as shown at block 1570 the system may determine that the energy limit is reached in block 1570. In response, the solenoid and electromagnet may be de-energized at block 1572. If there is a failure to release, then at block 1574 an error signal can be raised. These operations may cover failure modes such as external debris pulling the brake open, or holding electromagnet, as well as other situations.

Figure 16:
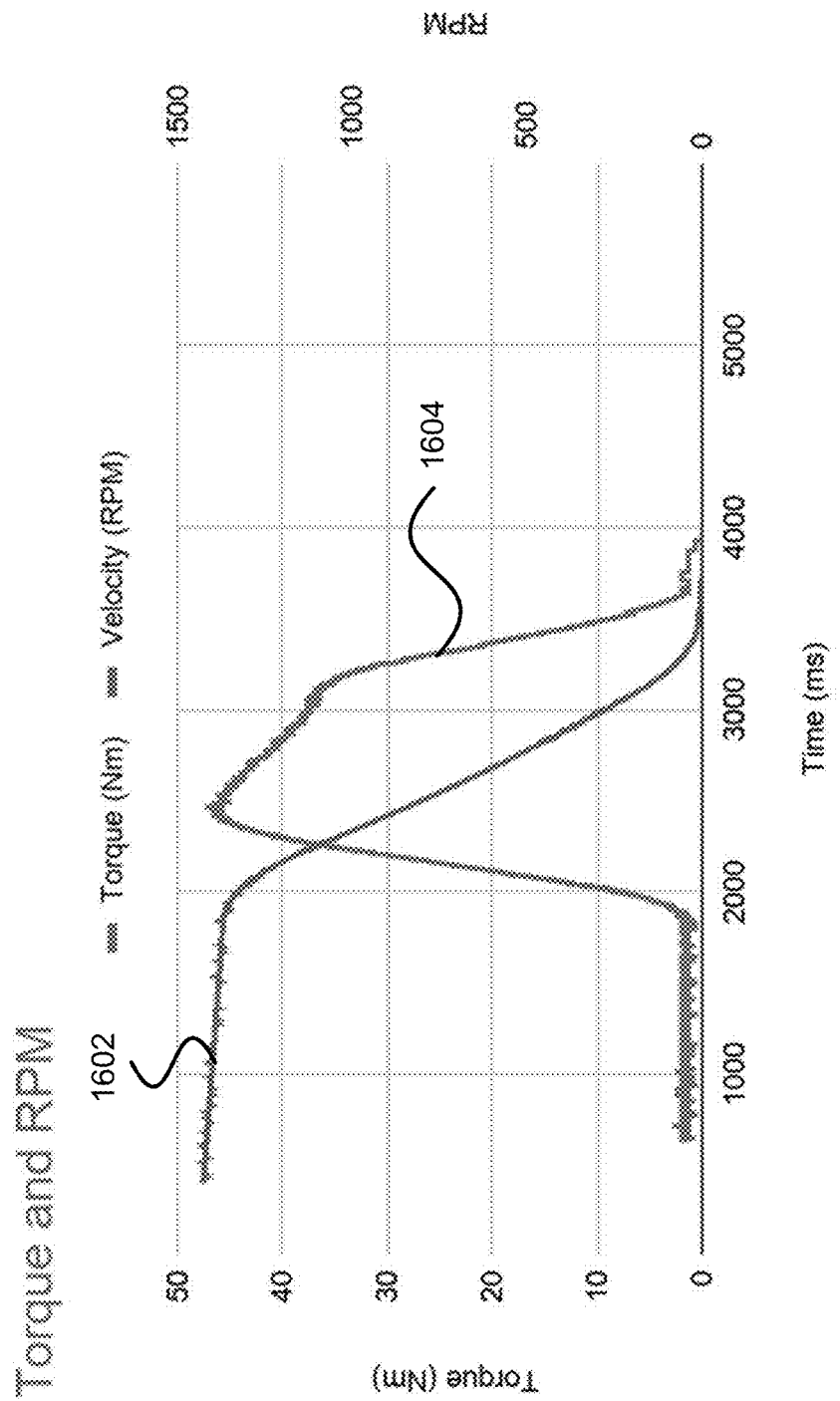
FIG. 16 illustrates a plot of torque and velocity versus time in accordance with aspects of the technology.

This braking approach may be repeated as needed during flight. For instance, it may be employed multiple times to prevent free spinning of the propeller blades, and then one time during final descent of the HAP back to earth. As mentioned above, without such a braking approach it may take tens of seconds, minutes or longer for the propeller blades to stop rotating. Furthermore, the propeller would almost certainly speed up from dynamic pressure on descent. The approaches presented herein may cause the blades to stop in a few seconds or less. For instance, FIG. 16 presents a plot 1600 of velocity (rpm) 1602 and torque 1604 versus time. As shown, once the brake pad engages the propeller hub, the measured torque increases rapidly as the velocity decreases rapidly. In this plot, just prior to 2500 ms, while the velocity continues to decrease linearly the torque begins to drop. And around the 3000 ms mark, when the velocity is very low (about 250 rpm versus more than 1250 rpm at 2000 ms) the torque quickly decreases from about 37 NM to almost 0 Nm by the 3700 ms mark. In this example, once the torque begins to increase, the velocity drops to 0 rpm within approximately 1500 ms. The reason that the torque experiences a knuckle from the rapid increase to a slow decrease to a rapid decrease is due to a beneficial property of the brake pad. When the rpms of the propeller are low, kinetic coefficient of friction dominates where most of the braking torque is generated from. When the rpms of the propeller are high, galling between the brake pad surface and propeller hub dominate where most of the braking torque is generated. This is beneficial because the kinetic coefficient of friction is mostly constant across increasing rpms; however, galling increases with increasing rpms. This leads to increasing brake torque for increasing rpms. Put simply, the higher the rpms and/or the higher the rotation force, the higher the braking force. However, above a certain rpms level, such as around 2000 or so, increasing rpms does not increase braking torque.

In one scenario, the solenoid uses a control loop to pull back the brake with constant power. This provides a pulling force independent of battery voltage. It can also provide consistent heat generation, which is worst at ambient temperature, allowing for easier qualification. This is because the solenoid winding resistance is highest at warmer temperatures. In addition, this type of control loop is able to provide a higher pull force for the same power consumed at flight temperatures, providing additional margin. This is because the solenoid winding is lowest at colder temperatures, which improves efficiency.

Figure 17:
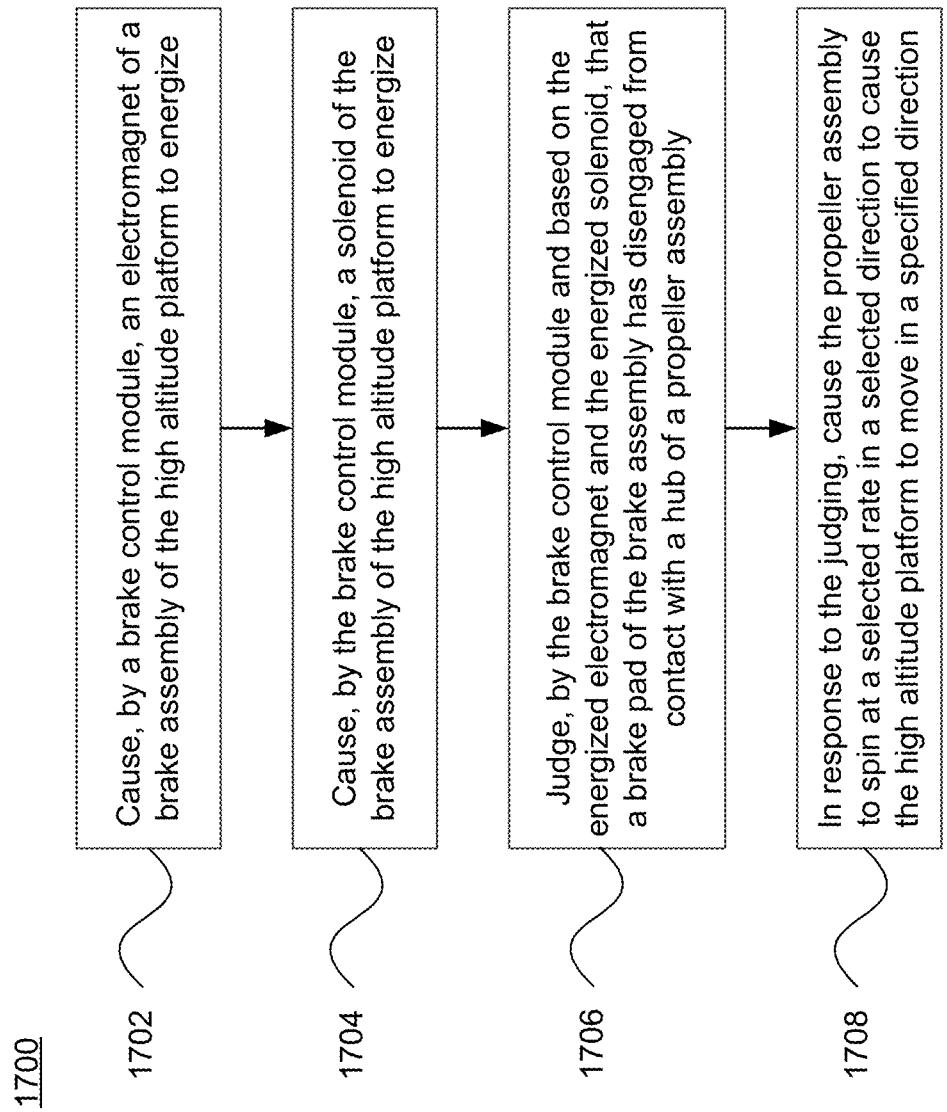
FIG. 17 illustrates a method according to aspects of the technology.

FIG. 17 illustrates an example method 1700 for controlling lateral propulsion in a HAP-type device that is configured to operate in the stratosphere. At block 1702, a brake control module causes an electromagnet of a brake assembly of the high altitude platform to energize. At block 1704, the brake control module causes solenoid of the brake assembly of the high altitude platform to energize. At block 1706, the brake control module judges, based on the energized electromagnet and the energized solenoid, that a brake pad of the brake assembly has disengaged from contact with a hub of a propeller assembly. And at block 1708, in response to the judging that the brake pad of the brake assembly has disengaged, the system causes the propeller assembly to spin at a selected rate in a selected direction to cause the high altitude platform to move in a specified direction.

And FIG. 18 illustrates another example method 1800 for controlling propeller operation in a high altitude platform configured to operate in the stratosphere. At block 1802, the method includes determining, by a brake control module, that a brake pad of a brake assembly is disengaged from contact with a hub of a propeller assembly of the high altitude platform. The propeller assembly is configured to spin at a selected rate in a selected direction when the brake pad is disengaged in order to cause the high altitude platform to move in a specified direction. At block 1804, the brake control module determines whether a selected condition has occurred with respect to the high altitude platform. And at block 1806, in response to determining that the selected condition has occurred, the brake control module causes the brake pad to engage with the hub of the propeller assembly to cause the propeller assembly to cease rotation.

The foregoing examples are not mutually exclusive and may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A brake mechanism configured to stop rotation of a propeller assembly, the brake mechanism comprising:
   a brake pad configured to engage with a hub portion of the propeller assembly to stop the rotation of the propeller assembly;
   a housing receiving at least part of the brake pad therein during disengagement from the propeller assembly;
   a brake sensor configured to detect whether the brake pad is engaged with or disengaged from the hub portion of the propeller assembly;
   an actuator assembly including a magnet and an actuator, the actuator assembly configured to maintain the brake pad in a disengaged state during a first operational mode and to cause the brake pad to engage the hub portion of the propeller assembly during a second operational mode;

wherein the actuator assembly further includes a spring coupling the brake pad to the actuator, the spring configured to provide a spring force to cause the brake pad to engage the hub portion of the propeller assembly during the second operational mode; and, wherein the actuator assembly further includes an arm member coupled between the actuator and the spring.

2. The brake mechanism of claim 1, further comprising a cable affixed to the brake pad and the arm member, wherein the spring is disposed around at least part of the cable.

3. The brake mechanism of claim 1, wherein the arm member includes a first extension affixed to the magnet, a second extension opposite the first extension, and a central region disposed between the first extension and the second extension, the central region affixed to the actuator.

4. The brake mechanism of claim 3, further comprising:
a second magnet affixed to the second extension; and
a Hall Effect sensor in operative communication with the second magnet affixed to the second extension, the Hall Effect sensor configured to detect the strength of a magnetic field associated with the second magnet to detect a relative displacement of the brake pad.

5. The brake mechanism of claim 1, wherein the actuator is a solenoid.

6. The brake mechanism of claim 1, wherein the housing includes a housing bracket and a cover section affixed to the housing bracket, the housing bracket and the cover section defining a receptacle to at least partly receive the brake pad.

7. The brake mechanism of claim 6, wherein the housing bracket includes an arcuate side configured to abut a motor assembly that drives the propeller assembly.

8. A propulsion system for use with a high altitude platform configured to operate in the stratosphere, the propulsion system comprising:
a propeller assembly including a plurality of propeller blades and central propeller hub affixed to the plurality of propeller blades;
a motor assembly operatively coupled to the central propeller hub of the propeller assembly, the motor assembly being configured to actuate the propeller assembly to drive the high altitude platform in a lateral direction in the stratosphere; and
a brake mechanism configured to stop rotation of the propeller assembly, the brake mechanism comprising:
a brake pad configured to engage with the propeller hub of the propeller assembly to stop the rotation of the propeller assembly;
a housing receiving at least part of the brake pad therein during disengagement from the propeller assembly;
a brake sensor configured to detect whether the brake pad is engaged with or disengaged from the propeller hub of the propeller assembly;
an actuator assembly including a magnet and an actuator, the actuator assembly configured to maintain the brake pad in a disengaged state during a first operational mode and to cause the brake pad to engage the propeller hub of the propeller assembly during a second operational mode;
wherein the actuator assembly further includes a spring coupling the brake pad to the actuator, the spring configured to provide a spring force to cause the brake pad to engage the propeller hub of the propeller assembly during the second operational mode; and
wherein the actuator assembly further includes an arm member coupled between the actuator and the spring.

9. The propulsion system of claim 8, the brake mechanism further comprising a cable affixed to the brake pad and the arm member, wherein the spring is disposed around at least part of the cable.

10. The propulsion system of claim 8, wherein the arm member includes a first extension affixed to the magnet, a second extension opposite the first extension, and a central region disposed between the first extension and the second extension, the central region affixed to the actuator.

11. The propulsion system of claim 10, further comprising:
a second magnet affixed to the second extension; and
a Hall Effect sensor in operative communication with the second magnet affixed to the second extension, the Hall Effect sensor configured to detect a strength of a magnetic field associated with the second magnet to detect a displacement of the brake pad relative to the propeller hub.

12. The propulsion system of claim 8, wherein the actuator is a solenoid.

13. The propulsion system of claim 8, wherein the housing includes a housing bracket and a cover section affixed to the housing bracket, the housing bracket and the cover section defining a receptacle to at least partly receive the brake pad.

14. The propulsion system of claim 13, wherein the housing bracket includes an arcuate side configured to abut a housing of the motor assembly.

15. A high altitude platform configured to operate in the stratosphere, the high altitude platform comprising:
a balloon envelope,
a payload;
a connecting member coupling the payload to the balloon envelope; and
the propulsion system having:
a propeller assembly including a plurality of propeller blades and central propeller hub affixed to the plurality of propeller blades;
a motor assembly operatively coupled to the central propeller hub of the propeller assembly, the motor assembly being configured to actuate the propeller assembly to drive the high altitude platform in a lateral direction in the stratosphere; and
a brake mechanism configured to stop rotation of the propeller assembly, the brake mechanism comprising:
a brake pad configured to engage with the propeller hub of the propeller assembly to stop the rotation of the propeller assembly;
a housing receiving at least part of the brake pad therein during disengagement from the propeller assembly;
a brake sensor configured to detect whether the brake pad is engaged with or disengaged from the propeller hub of the propeller assembly; and
an actuator assembly including a magnet and an actuator, the actuator assembly configured to maintain the brake pad in a disengaged state during a first operational mode and to cause the brake pad to engage the propeller hub of the propeller assembly during a second operational mode;
wherein the propulsion system is operatively engaged with the connecting member.

16. The high altitude platform of claim 15, further comprising a control system configured to actuate the brake mechanism for engagement with and disengagement from the propeller hub in response to a predetermined condition.

\* \* \* \* \*